United States Patent
Takahashi

(10) Patent No.: US 8,390,833 B2
(45) Date of Patent: *Mar. 5, 2013

(54) GENERATING WORKFLOW DATA CORRESPONDING TO PROCESS ICONS

(75) Inventor: Hiroyuki Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/048,799

(22) Filed: Mar. 15, 2011

(65) Prior Publication Data

US 2011/0164281 A1    Jul. 7, 2011

Related U.S. Application Data

(63) Continuation of application No. 10/986,106, filed on Nov. 12, 2004, now Pat. No. 7,924,444.

(30) Foreign Application Priority Data

Nov. 13, 2003   (JP) ................................. 2003-383652

(51) Int. Cl.
  *G06F 3/12*   (2006.01)
  *G06F 3/048*  (2006.01)
(52) U.S. Cl. ...... 358/1.13; 358/1.15; 715/769; 715/845; 715/856; 715/859
(58) Field of Classification Search ........................ None
See application file for complete search history.

(56) References Cited

U.S. PATENT DOCUMENTS

| 4,755,902 | A | 7/1988 | Takahashi |
| 6,147,770 | A | 11/2000 | Unishi et al. |
| 6,149,323 | A | 11/2000 | Shima |
| 2002/0021310 | A1* | 2/2002 | Nakai et al. .................. 345/837 |
| 2002/0030840 | A1* | 3/2002 | Itaki et al. .................... 358/1.13 |
| 2003/0014446 | A1* | 1/2003 | Simpson et al. ............. 707/527 |
| 2003/0066027 | A1* | 4/2003 | Nakagiri ...................... 715/500 |
| 2003/0095153 | A1* | 5/2003 | Bosma et al. ................ 345/859 |
| 2005/0275869 | A1* | 12/2005 | Yokoyama ................... 358/1.14 |

FOREIGN PATENT DOCUMENTS

| JP | 5-265681 A | 10/1993 |
| JP | 2001-159940 A | 6/2001 |
| JP | 2002-135602 A | 5/2002 |

* cited by examiner

*Primary Examiner* — Vincent Rudolph
(74) *Attorney, Agent, or Firm* — Fitzpatrick, Cella, Harper & Scinto

(57) ABSTRACT

A data processing apparatus for executing predetermined printing processes to a file has: a display for displaying a plurality of boxes (folders) associated with a plurality of printing processes (for example, 2up, Duplex, Staple) which can be executed to the file; and a mouse for inputting a moving instruction to the file displayed on the display. When it is detected that the file which is moved by the moving instruction input by the mouse has passed through the plurality of boxes (folders) displayed on the display, the printing processes regarding the boxes (folders) through which the file has passed are executed to the file on the basis of the detection result.

8 Claims, 42 Drawing Sheets

| FIG. 17A | FIG. 17B |

FIG. 21

| | | |
|---|---|---|
| JOB PRIORITY: | MEDIUM | ▼ |
| JOB MANAGEMENT: | SAVE JOB | ▼ |
| REPRINT MANAGEMENT: | DELETE PRINT READY FILE | ▼ |
| JOB SCHEDULING: | PRINT | ▼ |
| E-MAIL NOTIFICATION: | DISABLED | ▼ |
| E-MAIL ADDRESS: | | |
| ANNOTATION: | DISABLED | ▼ |
| ANNOTATION TEXT: | | |

} 4322

JOB MANAGEMENT

FIG. 22

FINISHING

| | | |
|---|---|---|
| STAPLING: | OFF | ▼ |
| HOLE PUNCH: | OFF | ▼ |
| BOOKLET: | OFF | ▼ |
| Z-FOLD: | OFF | ▼ |
| USE INSERTER: | OFF | ▼ |
| INSERT PAGE: | | |
| BANNER PAGE: | OFF | ▼ |
| SORTING: | COLLATE | ▼ |
| TRIMMER: | OFF | ▼ |
| TRIM OFFSET: | | |

IMAGE QUALITY

| | |
|---:|:---|
| SHARPNESS: | NORMAL ▼ |
| BRIGHTNESS: | NORMAL ▼ |
| COLOR MODE: | CMYK ▼ |
| TONER REDUCTION: | OFF ▼ |
| COPIER MODE: | CHARACTER ▼ |
| GLOSS ADJUSTMENT: | STANDARD ▼ |
| PURE BLACK TEXT/GRAPHICS: | OFF ▼ |
| GLOSS ADJUSTMENT: | OFF ▼ |
| FORCE BLACK OVERPRINT: | OFF ▼ |
| GRADATION SMOOTHING: | OFF ▼ |
| COMBINE SEPARATION: | OFF ▼ |
| DOTS PER PIXEL: | 8 ▼ |

COLOR

| | |
|---:|:---|
| LINEARIZATION PROFILE: | MFP104.LUD ▼ |
| ICC COLOR MATCHING: | ENABLED ▼ |
| RENDERING INTENT: | PERCEPTUAL ▼ |
| ICC PRINTER PROFILE: | MFP104.icc ▼ |
| ICC CMYK PROFILE: | SWOP.icc ▼ |
| ICC RGB PROFILE: | SRGB.icc ▼ |
| BLACK LIMIT (0-255): | 255 ▼ |
| CYAN LIMIT (0-255): | 255 ▼ |
| MAGENTA LIMIT (0-255): | 255 ▼ |
| YELLOW LIMIT (0-255): | 255 ▼ |
| TOTAL LIMIT (0-255): | 1020 ▼ |

| | FOLDER LOCATION ADMINISTRATION TABLE | |
|---|---|---|
| | ICON | COORDINATE INFORMATION X, Y INTERVALS |
| MODE A | ⋮ | ⋮ |
| | 2UP | ($\Delta X, \Delta Y$) |
| | 4UP | ($\Delta X, \Delta Y$) |
| | 8UP | ⋮ |
| | ⋮ | ⋮ |
| MODE B | ICON | COORDINATE INFORMATION X, Y INTERVALS |
| | 4up ¥ Duplex | ($X_0+\Delta X, Y_0+\Delta Y$) |
| | 4up ¥ Duplex ¥ Staple ON | ⋮ |
| | Email12user&Print10Copies | ⋮ |
| | | ⋮ |
| | ⋮ | ⋮ |
| | ⋮ | ⋮ |

X0: MIN INTERVAL
Y0: MIN INTERVAL

GENERATING WORKFLOW DATA CORRESPONDING TO PROCESS ICONS

This application is a continuation of U.S. patent application Ser. No. 10/986,106, filed Nov. 12, 2004 (allowed), the contents of which are incorporated by reference herein.

BACKGROUND OF THE INVENTION

1. Field of the Invention

The invention relates to an information processing apparatus, its control method, a printing apparatus, and its control method.

2. Related Background Art

Hitherto, a box function which is used in a data processing apparatus, for example, an image forming apparatus is a function for storing data from a client computer as if it were filed. The box function has been developed to such various functions that the data is printed when the user needs it in accordance with necessary settings by using such a function, the data stored in a box is coupled, security is raised by providing a password, and the like.

At this time, the function is constructed in such a manner that in the case of making various data processing requests, icons or the like are displayed onto an operation display unit or a setting screen which is displayed on the data processing apparatus side so as to enable the user to easily instruct the operation. A data processing apparatus which can execute a process for associating folders with functions as icons or the like is disclosed in Japanese Patent Application Laid-Open No. 2002-135602.

Japanese Patent Application Laid-Open No. 2002-135602 also discloses an image processing apparatus with a confidential box table having an instruction text which can conditionally set a processing method for image data stored in a confidential box every confidential box so that a desired process can be automatically executed to the image data.

However, in the recent market where a large number of copies or a large number of jobs called Print On Demand (POD) are handled, the case where data is print-processed by using a digital print in place of printing has been increasing. As compared with the conventional print industry, the digitalization is assimilated, administration and control using computers are penetrating and approaching the level of the print industry to a certain extent by using the computers.

Particularly, in CRD (Centralized Reproduction Department), PFP (Print For Pay), or the like, the apparatus has several routine-worked workflows in order to process such a large number of jobs. However, the jobs are processed on the basis of predetermined settings or processing flows each time.

There is, consequently, such a problem that even if the techniques disclosed in Japanese Patent Application Laid-Open No. 2002-135602 are applied to, for example, in the case of performing an image processing setup to a series of flows in the image processing apparatus, the user is forced to execute the complicated operation every setup cannot determine a series of flows by the simple operation.

Such a kind of problem is not limited to the image processing apparatus but is a common problem among various electronic apparatuses, particularly, apparatuses which can decide a series of processes by operating icons or the like.

SUMMARY OF THE INVENTION

The invention is made in consideration of the above problems and it is an object of the invention to provide an improved information processing apparatus, its control method, a printing apparatus, and its control method.

Another object of the invention is to provide an improved information processing apparatus, its control method, a printing apparatus, and its control method, in which a predetermined printing process can be executed to a file by executing a simple operation to the file.

According to one aspect of the invention, there are provided an information processing apparatus and its control method in which by inputting a moving instruction to a file and passing through a plurality of display units regarding a printing process, a predetermined printing process is executed to the file.

According to another aspect of the invention, there are provided a printing apparatus and its control method in which by inputting a moving instruction to a file and passing through a plurality of display units regarding a printing process, a predetermined printing process is executed to the file.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 21 is a diagram showing an example of a job ticket which can be set in the image processing system according to the invention;

FIG. 22 is a diagram showing an example of the job ticket which can be set in the image processing system according to the invention;

FIG. 23 is a diagram showing an example of the job ticket which can be set in the image processing system according to the invention;

FIG. 24 is a diagram showing an example of the job ticket which can be set in the image processing system according to the invention;

DESCRIPTION OF THE PREFERRED EMBODIMENTS

Figure 1:
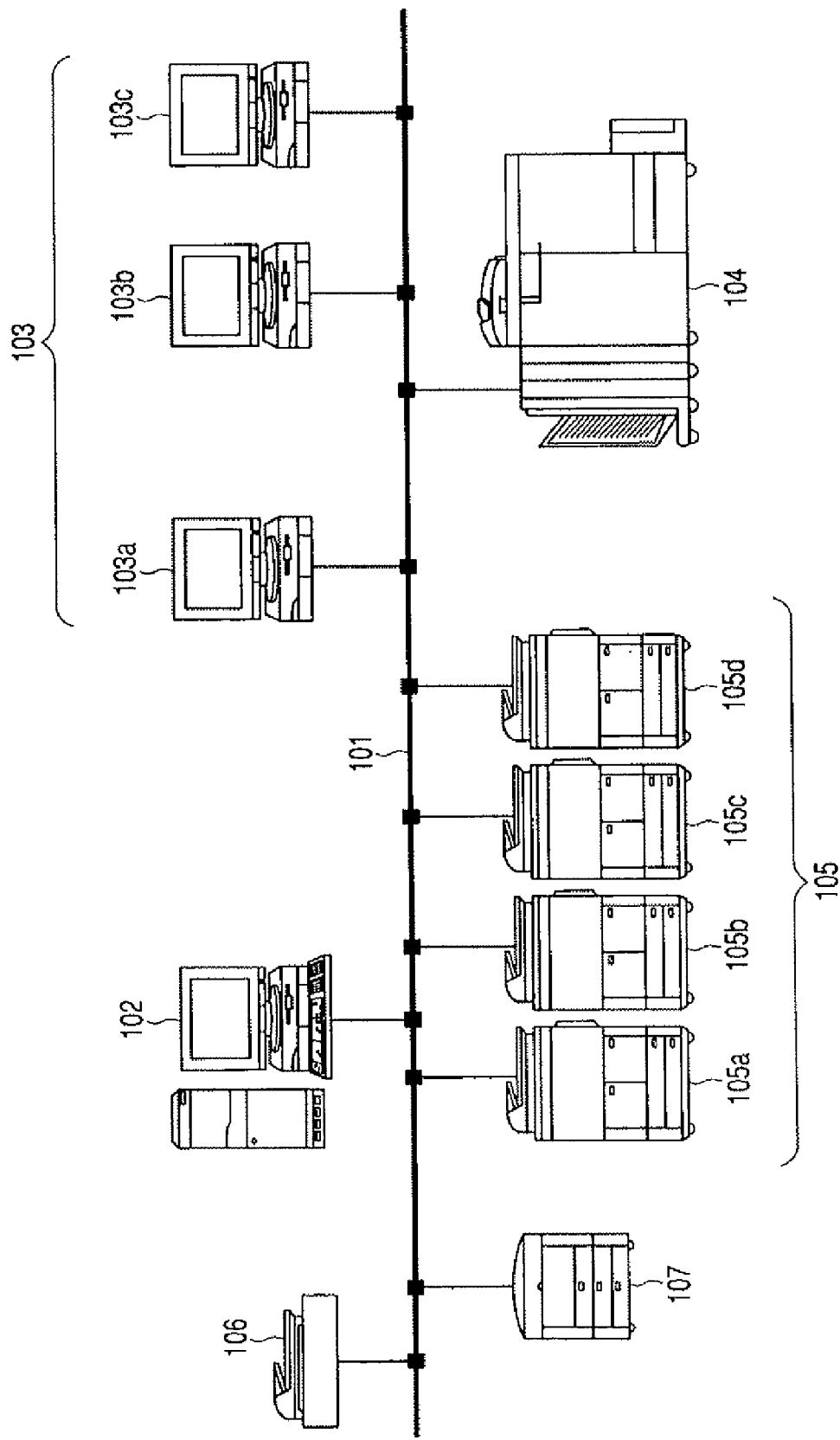
FIG. 1 is a conceptual diagram for explaining a construction of an image processing system to which a data processing apparatus showing the first embodiment of the invention can be applied.

The present invention will now be described in detail with reference to the drawings showing preferred embodiments thereof. In the drawings, elements and parts which are identical throughout the views are designated by identical reference numerals, and duplicate description thereof is omitted.

First Embodiment

FIG. 1 is a conceptual diagram for explaining a construction of an image processing system to which a data processing apparatus showing the first embodiment of the invention can be applied and shows a constructional example of a relatively simple network system.

In FIG. 1, there are a server computer 102 and client computers 103a, 103b, and 103c as computers and the server computer 102 administrates those client computers 103a, 103b, and 103c. Although not shown, a number of client computers are connected besides those client computers and there is a case where the client computers are represented by reference numeral 103 hereinbelow.

MFPs (Multi Function Peripherals) 104 and 105 (105a to 105d) and a printer 107 are connected to a network 101.

The MFP 104 is a full color MFP which can executes the operation such as scanning, printing, or the like in full color of high resolution and high gradation. When a data amount is very large, the MFP 104 can simultaneously transmit and receive a plurality of bits by an independent interface (a dedicated I/F unit 205, which will be explained hereinafter). The MFP 105 is a monochromatic MFP for executing the operation such as scanning, printing, or the like in monochromatic color. Although not shown, other apparatuses such as scanner, printer, facsimile apparatus (FAX), etc., as well as the MFPs other than those mentioned above are also connected to the network 101.

Further, a scanner 106 is an apparatus for fetching an image from a paper document. Besides the scanner 106 connected to the network as shown in the diagram, there are scanners connected to the computer by SCSI interfaces or the like. There is also a case where the scanner itself is supported as a part of functions of the MFP 105.

On the client computer 103, application software for executing what is called DTP (Desk Top Publishing) is made operative and various documents/figures are created/edited.

The client computer 103 converts the created documents/figures into a PDL (Page Description Language) and sends it to the MFP 104 or 105 through the network 101, thereby printing out.

<Constructions of the MFPs 104 and 105>

Constructions of the MFPs 104 and 105 will now be described. Since there is a difference of the full color and the monochromatic color between the MFPs 104 and 105 and the construction of the full color apparatus often contains the construction of the monochromatic apparatus with respect to portions other than color processes, the full color apparatus will be mainly explained here and an explanation of the monochromatic apparatus is added at any time as necessary.

<Construction of the Server>

Figure 2:
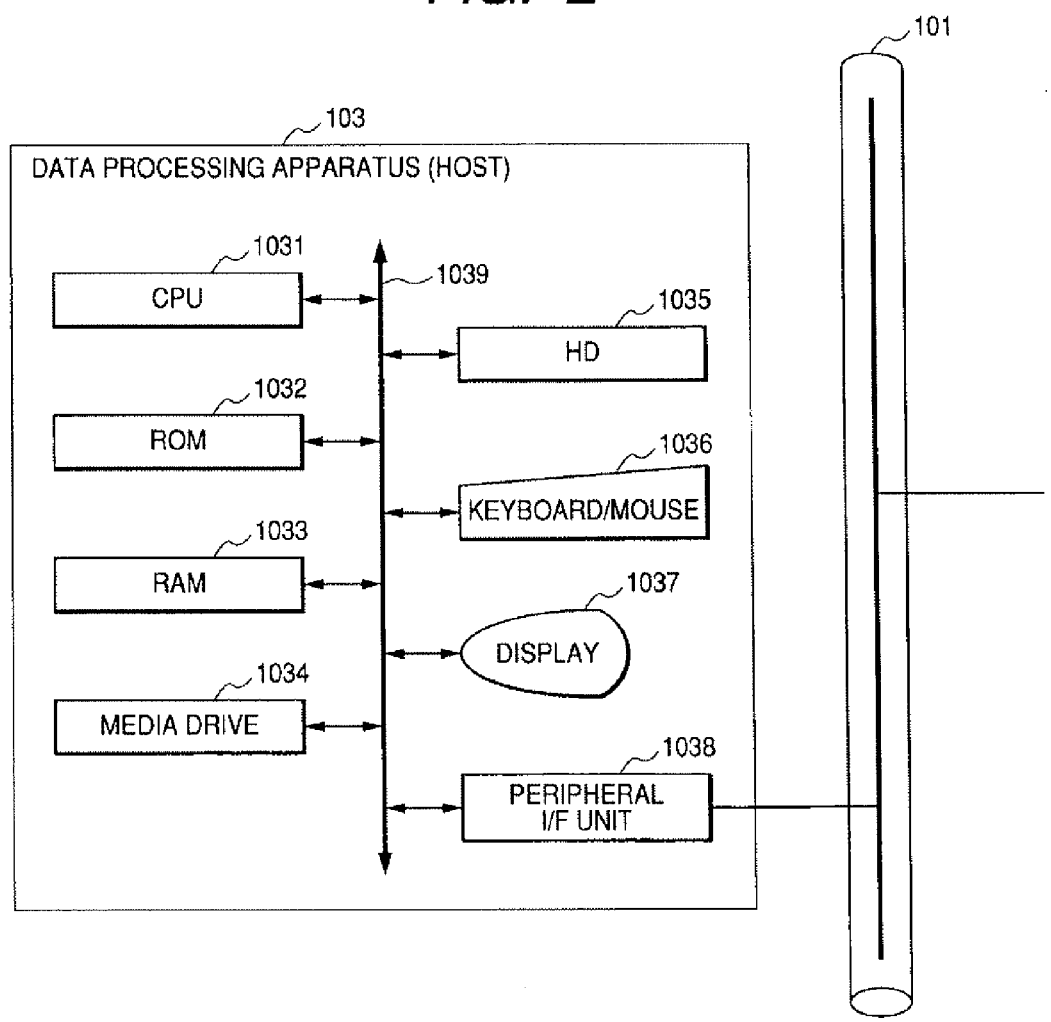
FIG. 2 is a block diagram for explaining a construction of a client computer shown in FIG. 1.

FIG. 2 is a block diagram for explaining the construction of the client computer (data processing apparatus) 103 shown in FIG. 1 and the same component elements as those in FIG. 1 are designated by the same reference numerals.

In the diagram, reference numeral 1031 denotes a CPU for collectively controlling devices connected to a CPU bus 1039 on the basis of control program codes held in a ROM 1032. Reference numeral 1033 denotes a RAM which functions as a temporary storage memory which is used by the CPU 1031. The RAM 1033 is constructed in such a manner that a memory capacity can be expanded by an optional RAM which is connected to an expansion board (not shown).

The RAM 1033 is also used to store a draw object formed as print data or used as a work memory or the like that is temporarily used by the control program held in the ROM 1032.

Reference numeral 1034 denotes a media drive serving as an access interface with various media such as flexible disk, CD, and DVD; 1035 a hard disk (HD) in which various programs, data, and the like are stored; 1036 a keyboard mouse serving as an interface unit for receiving an input from the user; 1037 a display serving as an output unit for transmitting information to the user; and 1038 a peripheral interface unit for bidirectionally connecting communication to a peripheral such as a printer or the like through the network.

Reference numeral 1039 denotes a CPU bus including address/data/control buses. The ROM 1032, RAM 1033, media drive 1034, HD 1035, keyboard/mouse 1036, display 1037, and peripheral I/F unit 1038 can access all of the devices connected to the CPU bus 1039, respectively.

The peripheral I/F unit 1038 can communicate with the MFP 104 through the network 101.

The CPU 1031 is constructed in such a manner that a Web browser is activated in accordance with the program and data stored in the hard disk 1035 and in the state where the folders and files with which functional processes as shown in FIGS. 29 to 35, which will be explained hereinafter, are associated are displayed, the user drags the file and continuously executes the operating instruction for tracing on the folder on which a desired functional process is shown by using, for example, a pointer as a guide (for example, in accordance with a procedure shown in FIGS. 36A and 36B), a series of data processes is displayed in a workflow field in which they have been registered so as to be mutually associated and, thereafter, he can execute the registered data processes.

Figure 3:
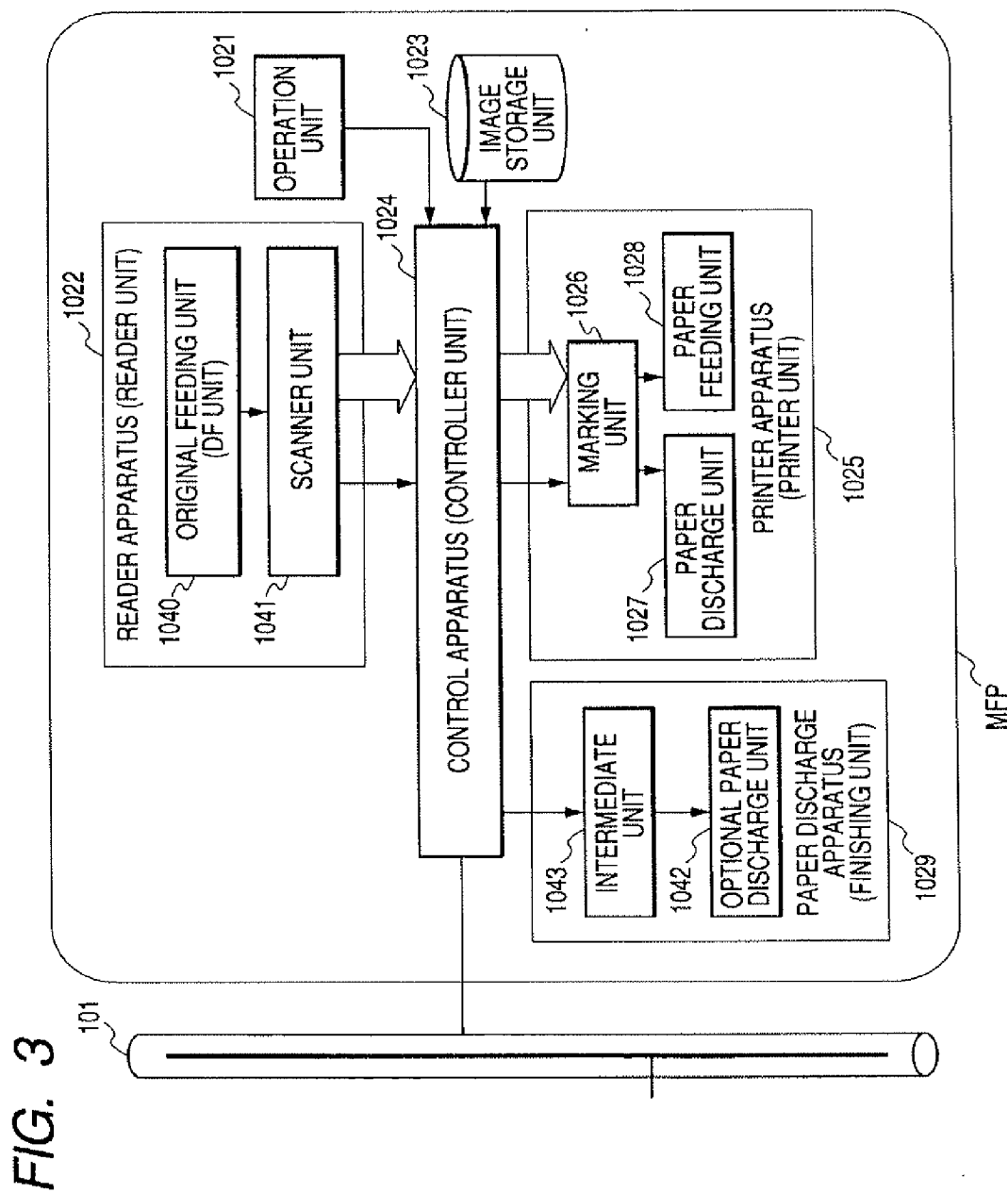
FIG. 3 is a block diagram for explaining a construction of an MFP shown in FIG. 1.

The CPU 1031 also makes such control that the functional information (for example, MIB) of the MFP shown in FIG. 3 which can be communicated with is obtained, a location of the folder which can be selected and executed and a folder functional process are allocated, and a layout of the folder is determined.

The above processes are not limited to a specific OS but can be realized by various OSs including a UI-like operating process and the apparatuses are not limited to the image processing system and the like, which will be explained hereinafter.

<Construction of the Devices>

FIG. 3 is a block diagram for explaining the constructions of the MFPs 104 and 105 shown in FIG. 1. In this example, the MFPs 104 and 105 are connected to the client computer 103 through the LAN (Local Area Network) 101 such as Ethernet™.

In FIG. 3, each of the MFPs 104 and 105 is constructed by: a reader unit 1022 for executing a reading process of image data; a printer unit 1025 for executing an outputting process of the image data; an operation unit 1021 having a keyboard to execute an input/output operation of the image data and a liquid crystal display (LCD) panel for executing a display/setup or the like of the image data and various functions; an image storage unit 1023 which can store/hold the image data read out by controlling the reader apparatus 1022 and the image data which is created from code data received by the client computer 103 through the LAN 101; and further, a controller unit 1024 to which a finishing unit 1029 for discharging print paper can be attached and which is connected to each of those component elements and controls them.

The reader unit 1022 has: an original feeding unit 1040 for conveying an original sheet; and a scanner unit 1041 for optically reading the original image and converting it into image data as an electric signal. The printer unit 1025 has: a paper feeding unit 1028 having a plurality of paper feeding cassettes for enclosing recording sheets; a marking unit 1026 for transferring/fixing the image data onto a recording sheet; and a paper discharge unit 1027 for executing a reversing process or the like of the printed recording sheet and conveying it to the finishing unit.

The finishing unit 1029 has: an intermediate unit 1043 for temporarily stacking the sheets every job or bundle of sheets; and an optional paper discharge unit 1042 for executing a finishing work such as staple, job offset, or the like and finally stacking printed matter.

The controller unit 1024 provides a copying function for reading the image data of the original by controlling the reader unit 1022 and outputting the image data to the recording sheet by controlling the printer unit 1025. The controller unit 1024 has functional blocks such as: network scanner function for converting the image data read out from the reader unit 1022 into code data and sending it to the client computer 103 through the network 101; network printer function for converting a draw command such as a PDL or the like or the code data which was received from the client computer 103 through the network 101 into the image data and outputting it the printer unit 1025; and the like.

The controller unit 1024 further has a finishing functional block for executing the operation such as stacking, staple, booklet, or job offset to the sheets printed by the copying function, network printer function, or the like and can sort or modify the sheets on a unit basis of a certain bundle.

The controller unit 1024 has a communication I/F equivalent to the peripheral I/F unit 1038 or the like shown in FIG. 2 and can communicate with the client computer 103.

Figure 4:
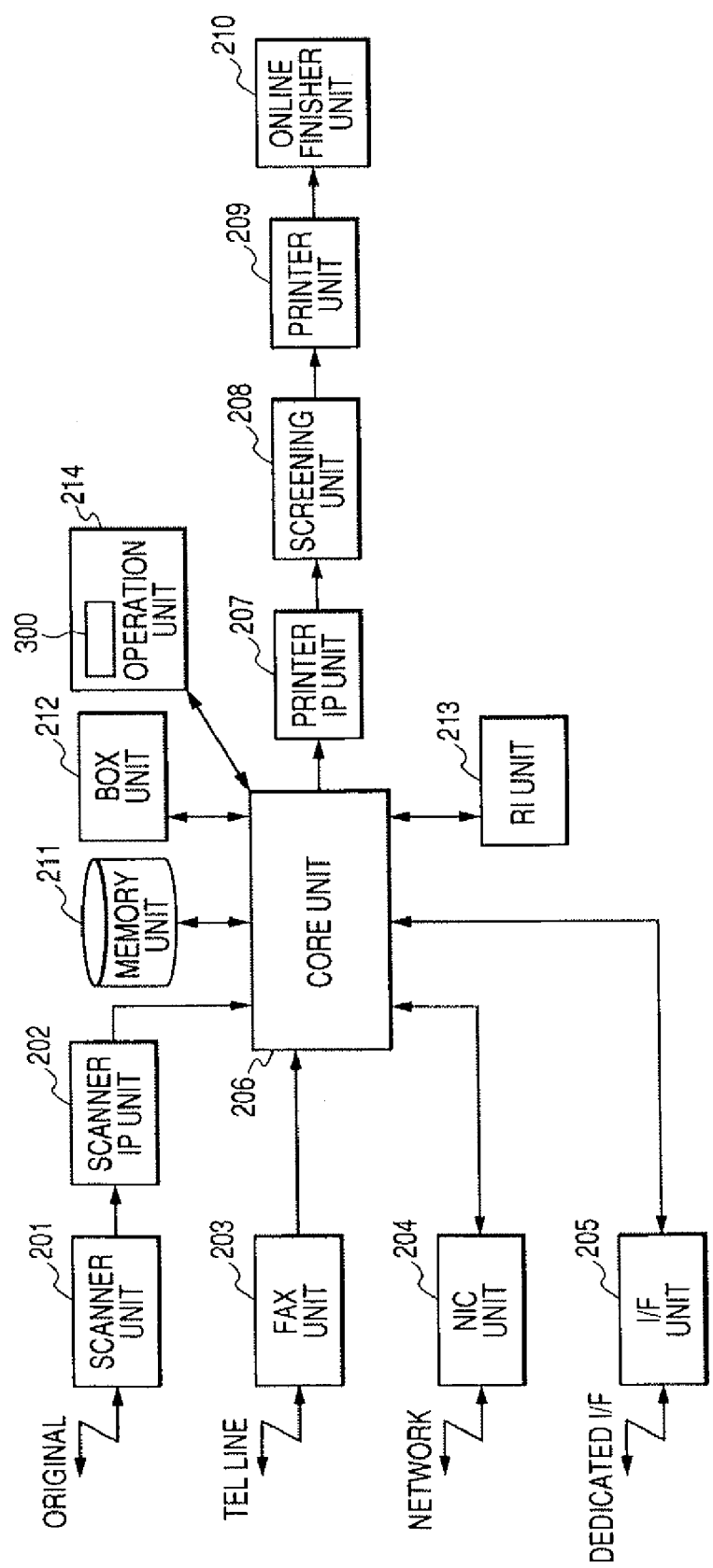
FIG. 4 is a block diagram for explaining the construction of the MFP shown in FIG. 1.

FIG. 4 is a block diagram for explaining the construction of each of the MFPs 104 and 105 shown in FIG. 1.

In FIG. 4, the MFP comprises: a scanner unit 201 for reading an image; a scanner IP unit 202 for image-processes the image data; a FAX unit 203 represented by a facsimile apparatus for transmitting and receiving the image by using a telephone line; an NIC (Network Interface Card) unit 204 for transmitting and receiving the image data and apparatus information by using the network; and the dedicated I/F unit 205 for exchanging the information with the full color MFP 104. In accordance with a using method of the MFPs 104 and 105, a core unit 206 makes control so as to temporarily store the image signal in an interlocking relational manner with a memory unit 211 or a box unit 212 which is used by dividing the memory unit 211 or determine a path.

Subsequently, the image data output from the core unit 206 is sent via a printer IP unit 207 and a screening unit 208 to a printer unit 209 for forming an image. The sheet which was printed out by the printer unit 209 is conveyed to an online finisher unit 210 and subjected to a sheet sorting process or a sheet finishing process.

The core unit 206 makes traffic control of the bus and paths are switched as shown in (A) to (I) as follows in accordance with the using method of the MFP. It is also generally known that when the data is passed via the network, compression data obtained by the system such as JPEG, JBIZ, ZIP, or the like is used. After the data enters the MFP, it is decoded (decompressed) in the core unit.

For example, the path (A) at the time of the copying function is set to (the scanner unit 201→the core unit 206→the printer unit 202). The path (B) at the time of the network scanner function is set to (the scanner unit 201→the core unit 206→the NIC unit 204). The path (C) at the time of the network printer function is set to (the NIC unit 204, the core unit 206→the printer unit 209). The path (D) at the time of the FAX transmitting function is set to (the scanner unit 201→the core unit 206→the FAX unit 203). A path (E) at the time of the FAX receiving function is set to (the FAX unit 203→the core unit 206→the printer unit 209). A path (F) at the time of the box receiving function is set to (the NIC unit 204→the core unit 206→the memory unit 211). A path (G) at the time of the box receiving function is set to (the scanner unit 201→the core unit 206→the memory unit 211). A path (H) at the time of the box transmitting function is set to (the memory unit 211→the core unit 206→the NIC unit 204). A path (I) at the time of the box transmitting function is set to (the memory unit 211 the core unit 206→the printer unit 209).

The box reception/box transmission denotes the input and storage of the data using the box unit 212 or the output of the stored data and are a function for dividing the memory every job or every user, temporarily storing the data, and transmitting and receiving the data in combination with a user ID and a password.

Further, an RIP (Raster Image Processor) unit 213 plays a role for developing the PDL data input from the NIC unit 204 into a bit map image as necessary.

Figure 5:
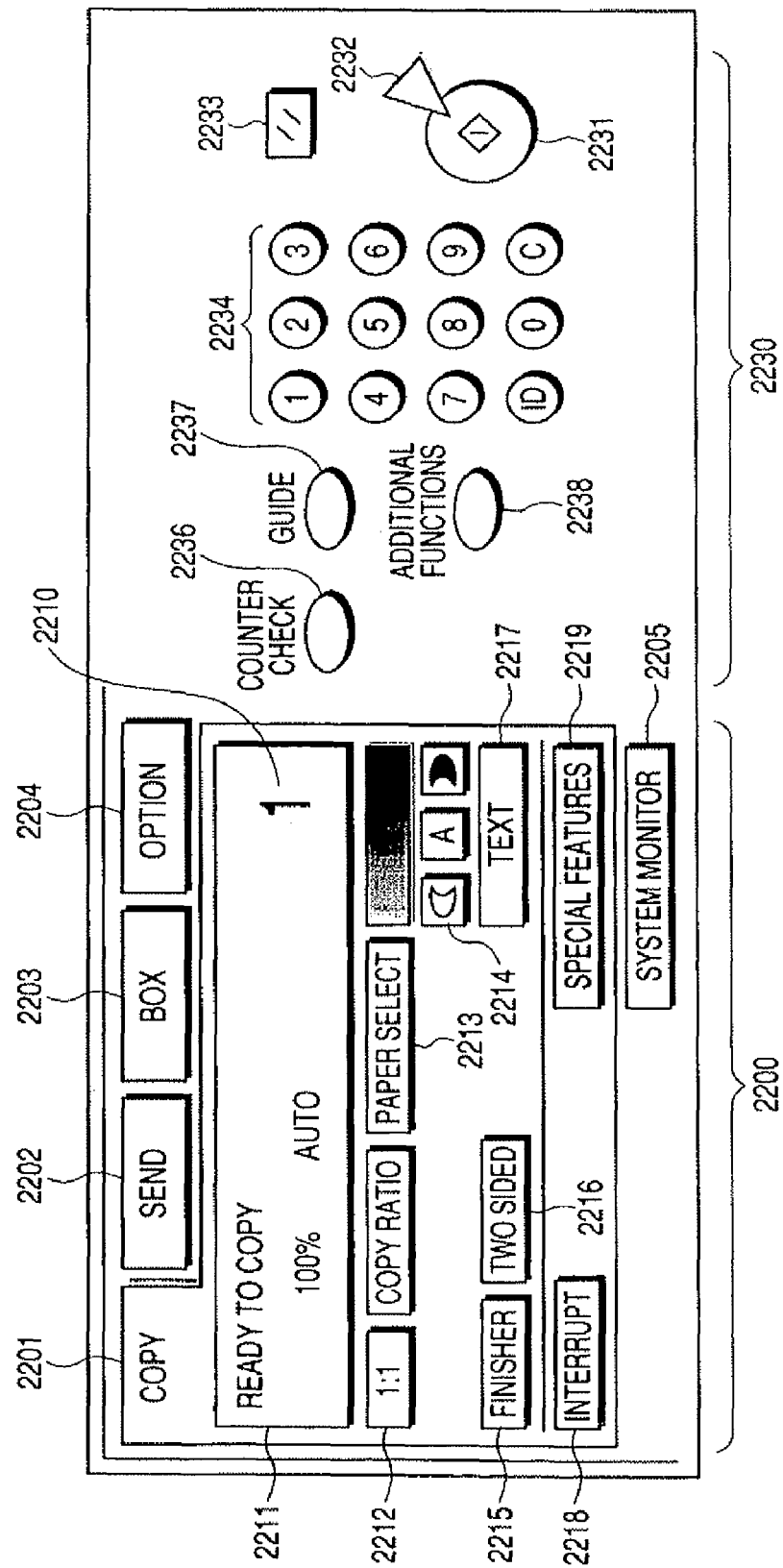
FIG. 5 is a block diagram for explaining a construction of an operation unit of the MFP shown in FIG. 1.
Figure 6:
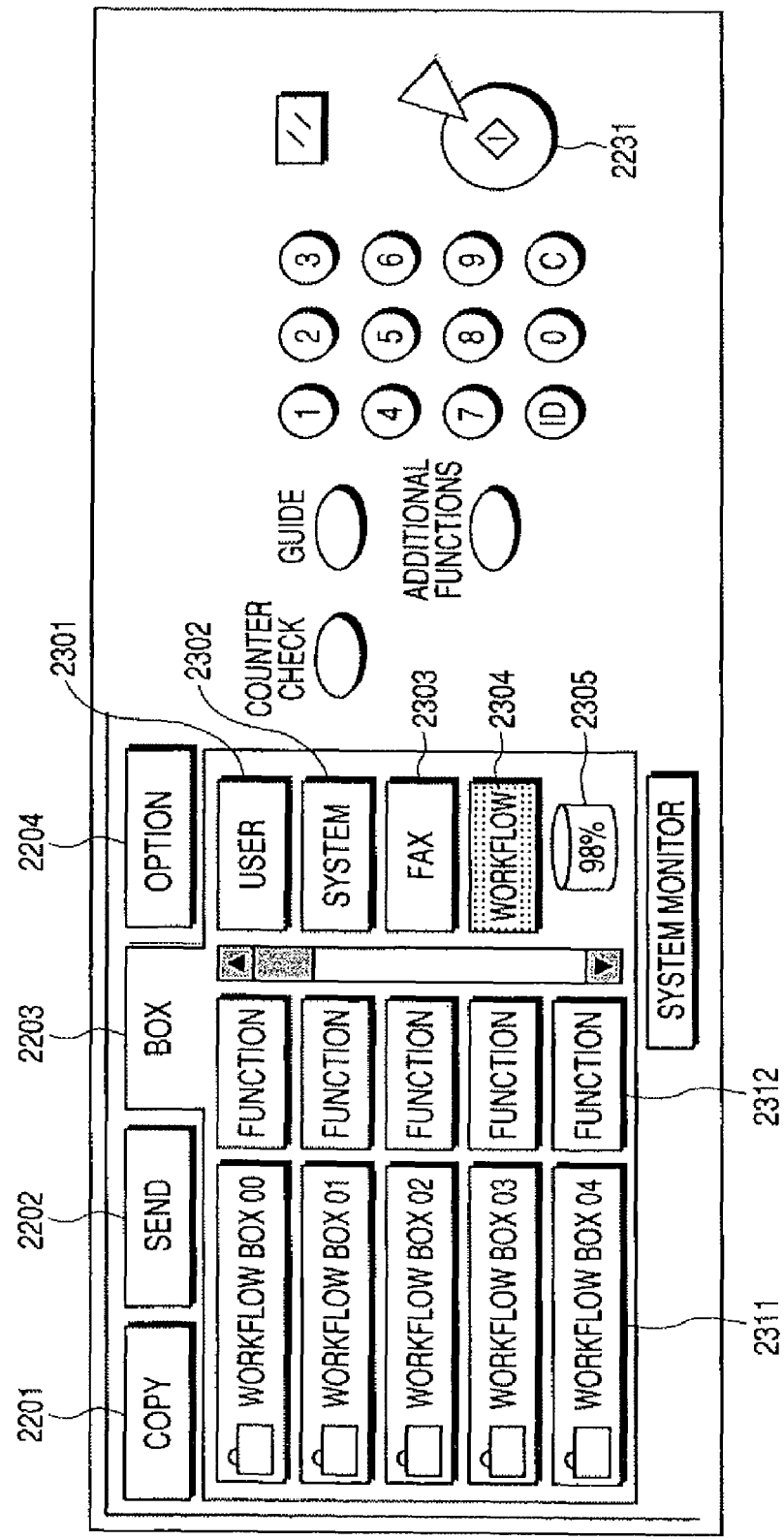
FIG. 6 is a block diagram for explaining the construction of the operation unit of the MFP shown in FIG. 1.

Reference numeral 214 denotes an operation unit having an LCD display unit 300 with a touch-panel structure. In this operation unit, information necessary for setting various modes and a status of the machine are displayed and controlled under the control of the core unit 206. In FIGS. 5, 6, and the like, which will be explained hereinafter, although the LCD display unit 300 is shown as an LCD display unit 2200, they are equivalent.

<Operation Unit>

FIGS. 5 and 6 are block diagrams for explaining a construction of the operation unit of each of the MFPs 104 and 105 shown in FIG. 1.

Figure 7:
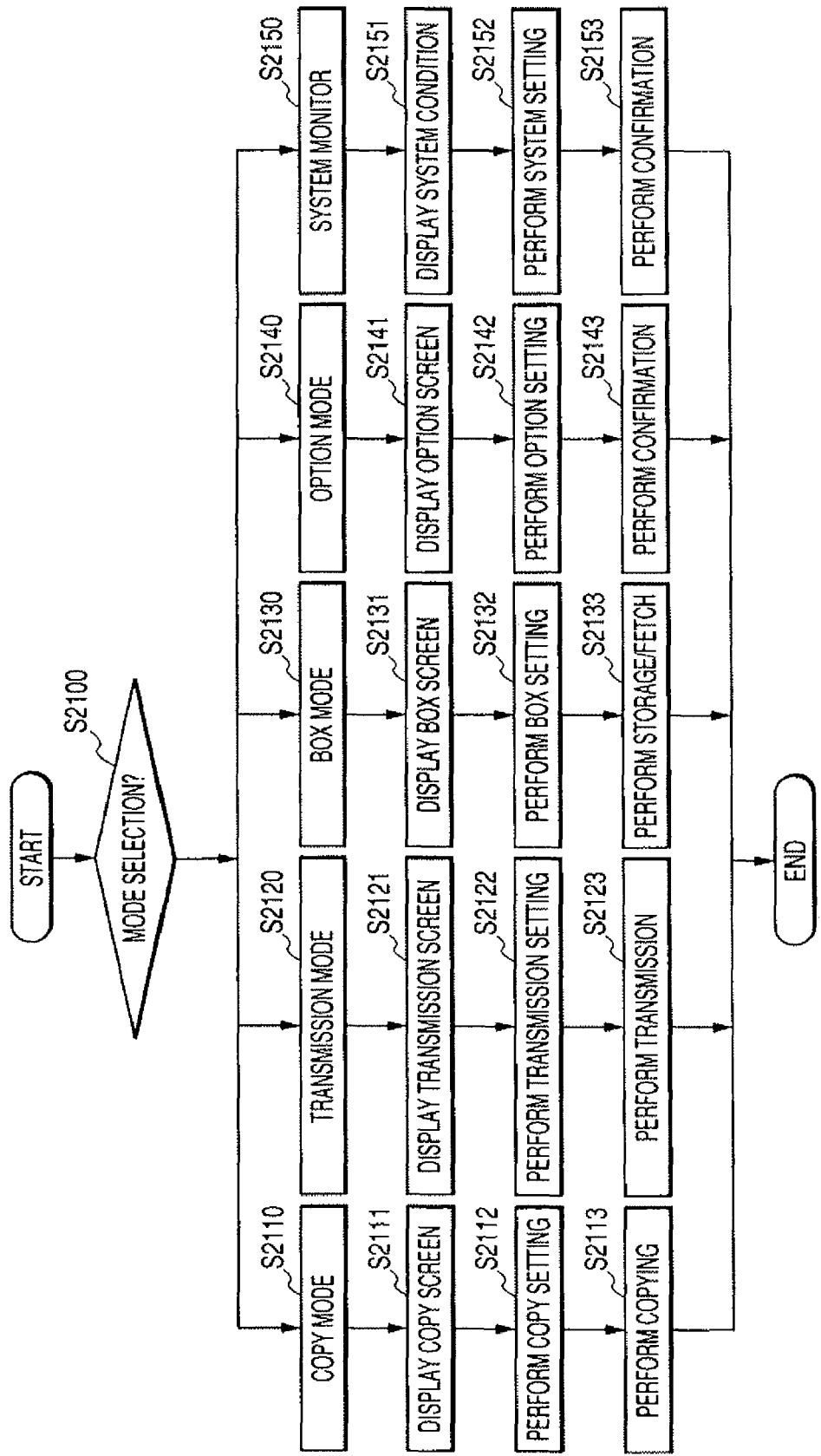
FIG. 7 is a flowchart showing an example of a first data processing procedure in the image processing system according to the invention.

In FIG. 5, the operation unit comprises the LCD (Liquid Crystal Display) unit 2200 of the touch-panel structure and a key operation unit 2230. FIG. 7 shows a flowchart showing a data processing procedure of the LCD display unit 2200.

FIG. 7 is the flowchart showing an example of a first data processing procedure in the image processing system according to the invention and corresponds to a display processing procedure which is executed by the core unit 206 shown in FIG. 4. S2100, S2110 to S2113, S2120 to S2123, S2130 to S2133, S2140 to S2143, and S2150 to S2153 denote processing steps, respectively.

First, a mode selection status is discriminated (S2100). If it is a copy mode to execute the copying operation, the system enters the copy mode (S2110). If it is determined to be a transmission mode, the system enters a transmission (sending) mode to perform the scan transmission (S2120). If it is determined to be a box mode, the system enters the box mode to fetch data from a box or edit it (S2130). If it is determined to be an option mode, the system enters the option mode to perform various setups (S2140). If it is determined to be a system monitor, the system enters the system monitor to recognize a system condition (S2150).

Particularly, when the system enters the copy mode, a copy screen is displayed onto the LCD display unit 2200 of the operation unit in step S2111. The copy setting from the user is received in step S2112. The scanner units and the printer units of the MFPs 104 and 105 are controlled on the basis of set copy conditions and a copying process is executed in step S2113. The processing routine is finished.

When the system enters the transmission mode, it shifts to the transmission mode of step S2120. A transmission screen is displayed onto the LCD display unit 2200 of the operation unit in step S2121. The transmission setting from the user is received in step S2122. The read-out image data is transmitted through the communication control unit and the network on the basis of set transmission conditions in step S2123. The processing routine is finished.

When the system enters the box mode, the system shifts to the box mode of step S2130. A box screen is displayed onto the LCD display unit 2200 of the operation unit in step S2131. The box setting from the user is received in step S2132. The data is stored or read out into/from a non-volatile storage apparatus (box unit 212) such as a hard disk or the like in each of the MFPs 104 and 105 on the basis of set box conditions in step S2133. The processing routine is finished.

If it is determined in step S2100 that the option mode is selected, the system shifts to the option mode of step S2140. An option screen is displayed onto the LCD display unit 2200 of the operation unit in step S2141. The option setting from the user is received in step S2142. Optional processes for the MFPs 104 and 105 are confirmed on the basis of set option conditions in step S2143. The processing routine is finished.

If it is determined in step S2100 that the system monitor is selected, the system shifts to the system monitor of step S2150. A system condition is displayed on the screen of the LCD display unit 2200 of the operation unit in step S2151. The system setting from the user is received in step S2152. The set system setting condition is confirmed in step S2153. The processing routine is finished.

In the embodiment, those modes are switched by pressing, for example, mode select keys 2201 to 2205 in the LCD display unit 2200 shown in FIG. 5 in accordance with the selection result of each mode.

In FIG. 6, by setting a paper size, a zoom ratio (magnification), an image mode, a finishing method, and the like in addition to the number of copies and pressing a start key 2231, the copying operation can be executed.

The display screen shown in FIG. 6 is a screen displayed when a box mode key 2203 is pressed. The box mode comprises a user box 2301, a system box 2302, a FAX box 2303, a workflow box 2304, and the like. By pressing those keys, each box is displayed in the LCD display unit 2200.

The display screen shown in FIG. 6 also shows the state where the workflow box 2304 has been selected. Reference numeral 2311 denotes each workflow box. For example, 100 independent boxes "00 to 99" are prepared. Each individual workflow can be set into each box by a function key 2312.

<Setting of the Workflows>

Figure 8:
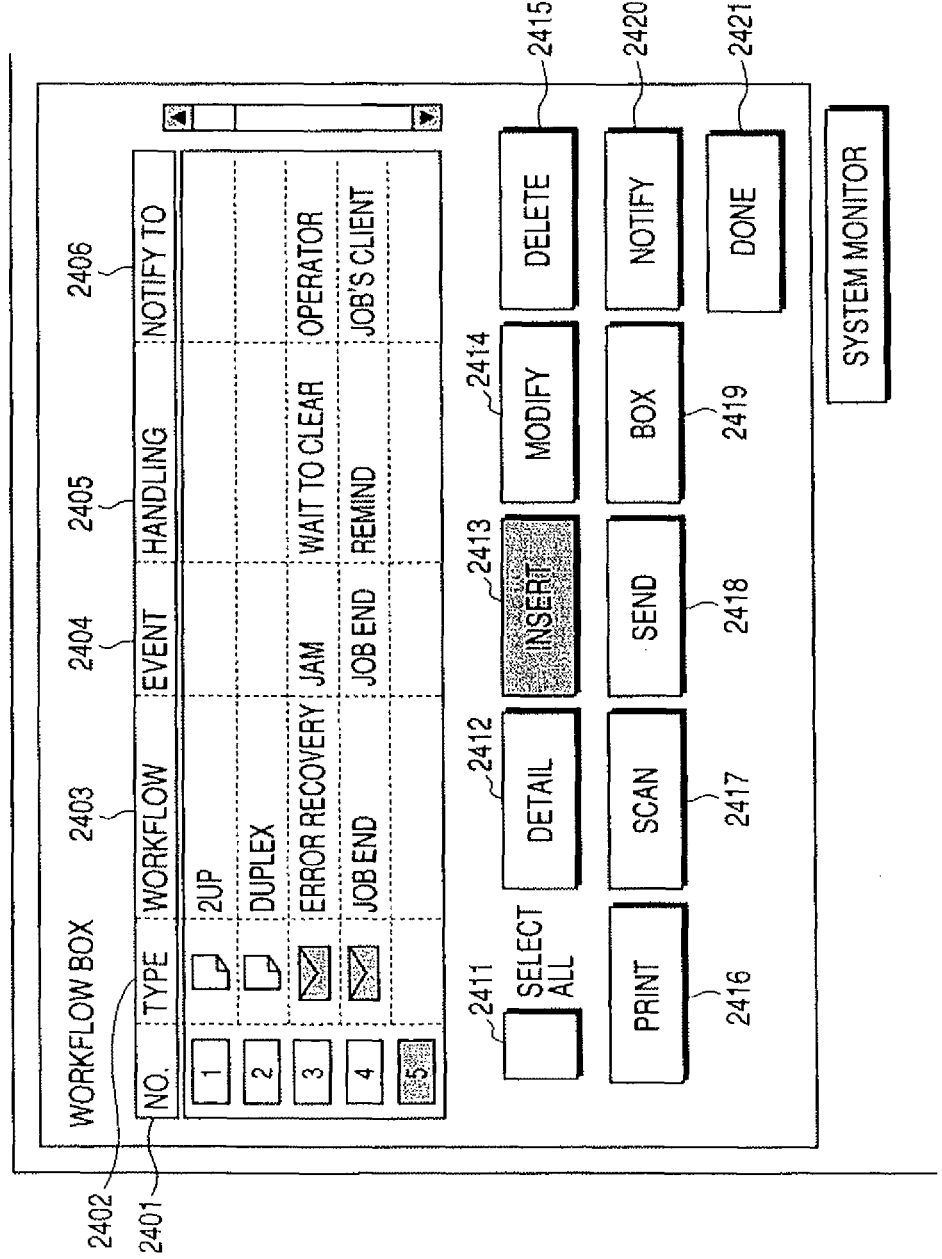
FIG. 8 is a diagram for explaining examples of display screens which are displayed on LCD display units shown in FIGS. 5 and 6.
Figure 9:
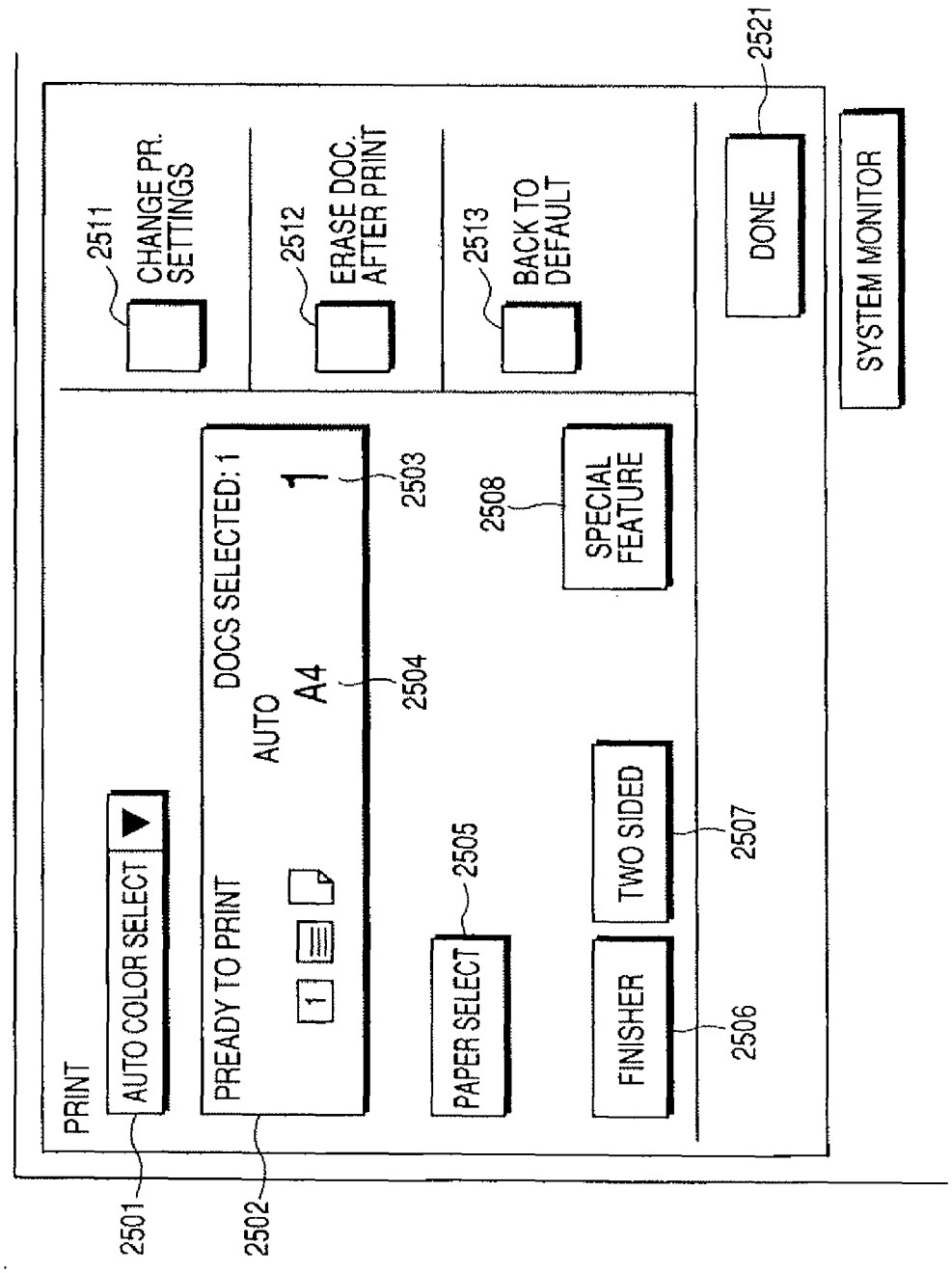
FIG. 9 is a diagram for explaining the examples of the display screens which are displayed on the LCD display units shown in FIGS. 5 and 6.
Figure 10:
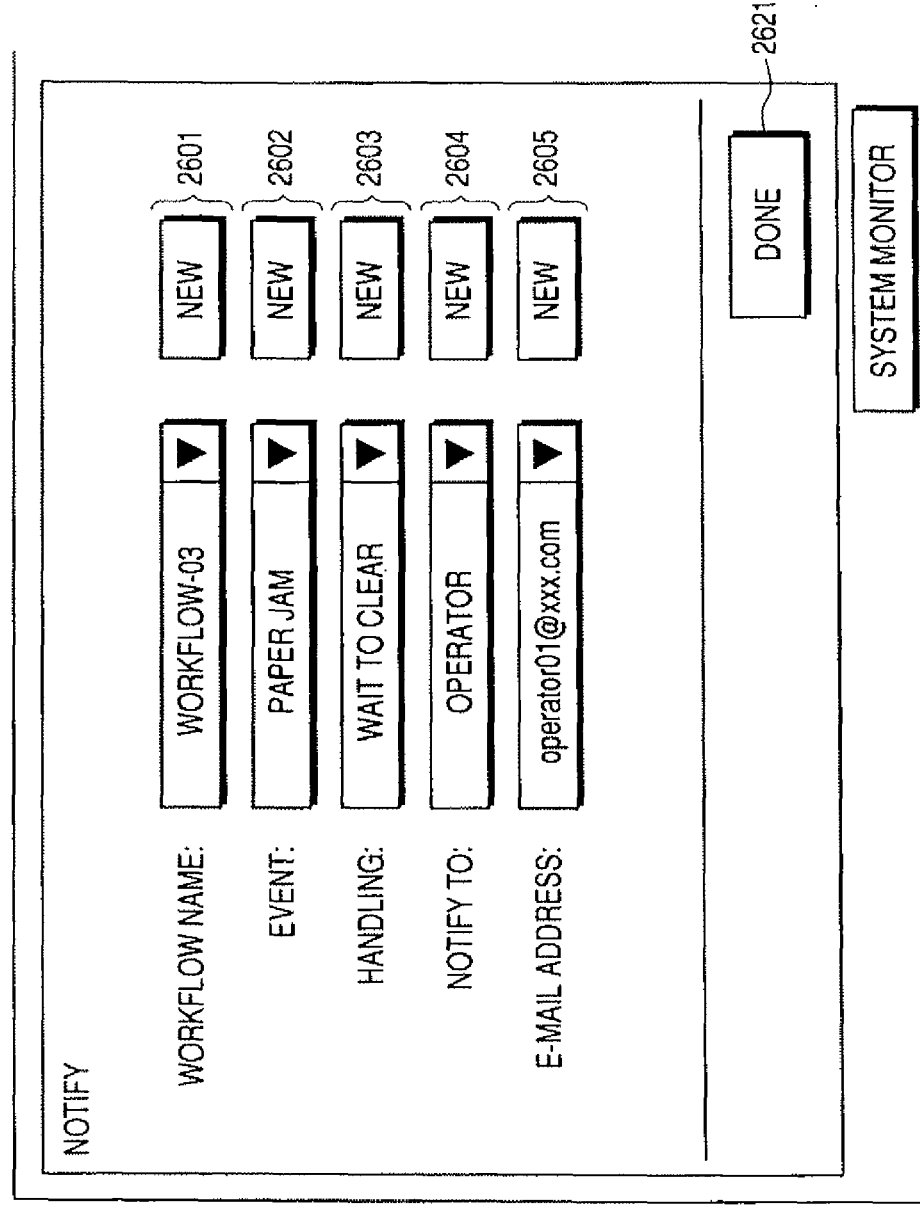
FIG. 10 is a diagram for explaining the examples of the display screens which are displayed on the LCD display units shown in FIGS. 5 and 6.

FIGS. 8 to 10 are diagrams for explaining examples of the display screens which are displayed on the LCD display unit 2200 shown in FIGS. 5 and 6.

In FIG. 6, by pressing the function key 2312, a setting screen of the workflow as shown in FIG. 8 is displayed on the LCD display unit 2200. At first, nothing is stored in the workflow and the workflow is formed by using a number key 2401 and an insert key 2413. If the user wants to rewrite the flow which has already been registered, the number key 2401 is selected and the flow is edited by a modify key 2414. If the user wants to delete the flow, it is erased by the number key 2401 and a delete key 2415.

If the user wants to see detailed contents of the formed flow, the detailed contents can be confirmed by pressing the number key 2401 and a detail key 2412.

The creation and editing are executed by using a print key 2416, a scan key 2417, a send key 2418, a box key 2419, and a notify key 2420. That is, in the case of setting the print function as a workflow, by pressing the print key 2416, a UI as shown in FIG. 9 appears, desired items can be set by various application modes 2508 provided for the MFP 104 (or 105) as well as a numeral 2503, paper sizes 2504 and 2505, a finishing method, 2506, and two sided (duplex) 2507. Some of those functions can also be combined and set.

Similarly, in the scan key 2417, a workflow of the scan function can be set. In the send key 2418, automatic transmission, broadcast transmission, or the like can be set. In the box key 2419, a workflow of the box reception or box transmission can be set. Further, by pressing the notify key 2420, a display screen as shown in FIG. 10 appears and an event 2602, a process 2603 at this time, to whom the event is notified 2604, its E-mail address 2605, and the like can be set. For example, if a paper jam occurs, a mode to wait until the paper jam is cleared, a mode to transfer the job to another printer, a mode to notify the operator of the occurrence of the paper jam, a mode to report a person who input the job, or the like can be preset. Such a series of processing flows is shown in a flowchart shown in FIG. 11.

Figure 11:
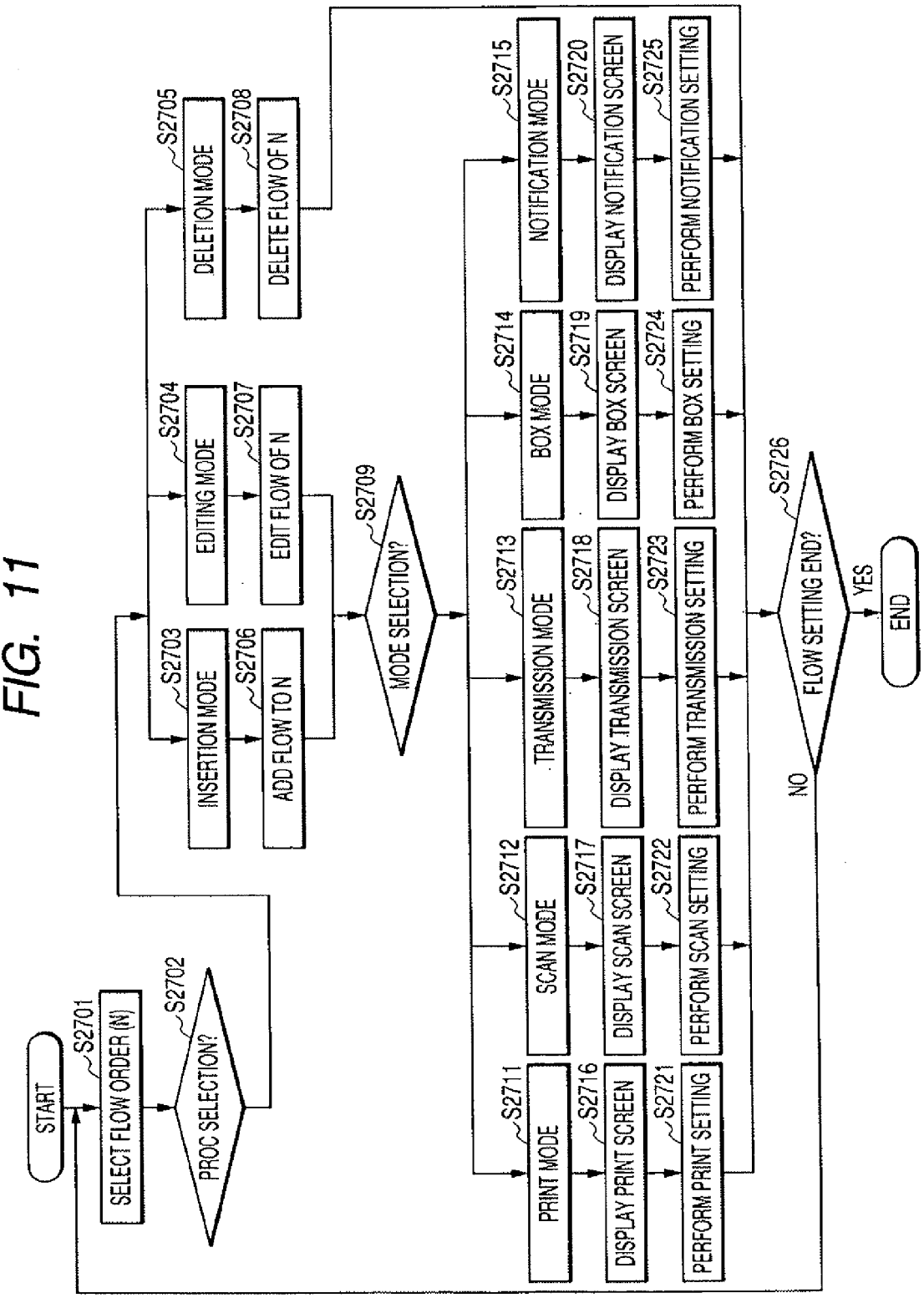
FIG. 11 is a flowchart showing an example of a second data processing procedure in the image processing system according to the invention.

FIG. 11 is a flowchart showing an example of a second data processing procedure in the image processing system according to the invention and corresponds to a workflow processing procedure. S2701 to S2709 and S2711 to S2726 denote processing steps.

First, a flow order (N) is selected in step S2701 and the contents of the selected process are discriminated in step S2702. If it is determined that the process is an insertion mode, the system enters the insertion mode in step S2703. A new flow is added to the flow (N) (if the flow (N) already exists, the existing flow (N) is shifted to the (N+1)th) in step S2706 and the processing routine advances to step S2709.

If it is determined to be an editing mode in step S2702, the system enters the editing mode, the Nth flow is corrected in step S2707, and step S2709 follows.

If it is determined to be a deletion mode in step S2702, step S2705 follows. The system enters the deletion mode, the Nth flow is deleted in step S2708, and step S2726 follows.

The selected mode is discriminated in step S2709. If it is determined to be a print mode (S2711), a print screen is displayed onto the LCD display unit 2200 (S2716), and print setting is performed (S2721).

The selected mode is discriminated in step S2709. If it is determined to be a scan mode (S2712), a scanner screen is displayed onto the LCD display unit 2200 (S2717), and scan setting is performed (S2722).

The selected mode is discriminated in step S2709. If it is determined to be a transmission mode (S2713), a transmission screen is displayed onto the LCD display unit 2200 (S2718), and transmission setting is performed (S2723).

The selected mode is also discriminated in step S2709. If it is determined to be a box mode (S2714), a box screen is displayed onto the LCD display unit 2200 (S2719), and box setting is performed (S2724).

The selected mode is discriminated in step S2709. If it is determined to be a notify mode (S2715), a notification screen is displayed onto the LCD display unit 2200 (S2720), and notification setting is performed (S2725).

The above operation is repetitively executed in accordance with the order of the workflow in step S2726 until the flow setting is finished.

<Scanner Driver>

Figure 12:
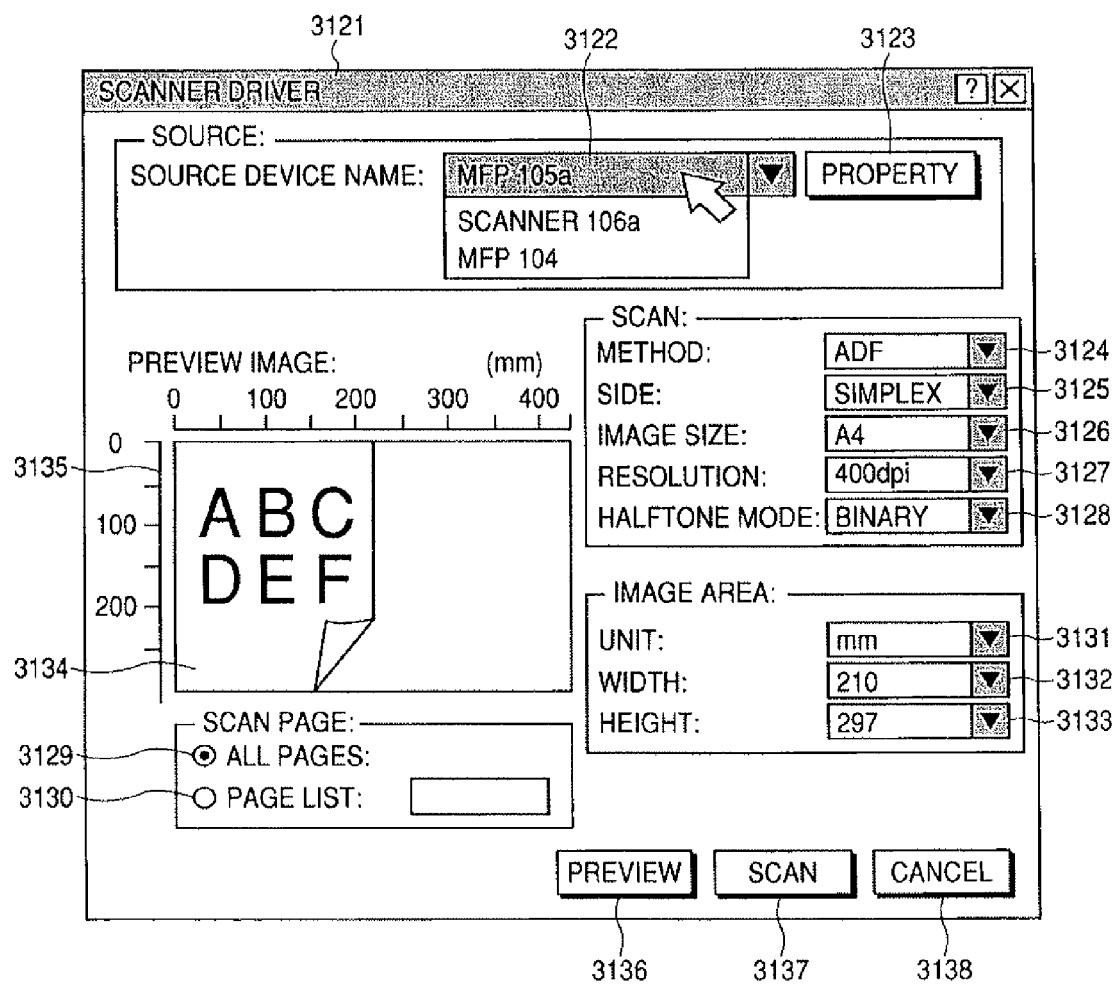
FIG. 12 is a diagram showing an example of a driver setting screen which can be displayed on a computer shown in FIG. 1.

FIG. 12 is a diagram showing an example of a driver setting screen which can be displayed on the client computer 103 (or 102) shown in FIG. 1 and relates to an example showing a GUI (Graphic User Interface) of the scanner driver for instructing, for instance, the scan operation. By instructing it, the user can indicate desired setting parameters and convert a desired image into image data.

In FIG. 12, reference numeral 3121 denotes a window of the scanner driver and 3122 indicates a source device selection column to select a transmitting source serving as a target as a setting item in the window 3121. Although it is generally a column like a scanner unit 201 as mentioned above, the image data can be also input from a device such as a digital camera.

Reference numeral 3123 denotes a property key which is clicked in the case of performing the detail setting regarding the selected source device. By pressing this key, the user can input set information peculiar to the device on another display screen, select a special image process (for example, character mode/photograph mode), and input an image in a processing mode according to it.

Reference numeral 3124 denotes a scan selection column which enables the user to select the fetching from a flat bed or an ADF (Auto Document Feeder). Reference numeral 3125 denotes a scan selection column which enables the user to instruct either a simplex (one sided) original or a duplex (two sided) original in the portion to instruct a reading surface of the original. Reference numeral 3126 denotes a scan selection column which enables the user to select an image size.

Reference numeral 3127 denotes a scan selection column which enables the user to input a numerical value of resolution at the time of reading the original. Reference numeral 3128 denotes a scan selection column which enables the user to select one of a simple binary, a dither method, an error diffusion, a multivalue (8 bits), and the like as a halftone mode for the image data to be read out.

Reference numerals 3129 and 3130 denote page setting buttons which enable the user to alternatively select either the mode for scanning all pages or the mode for scanning only the designated page when the ADF is used. Reference numerals 3131 to 3133 denote image area setting columns serving as a portion to decide a size of image area. This column enables the user to input a unit, a width length, and a height length, respectively.

After those items are designated, when a prescan key (SCAN) 3136 is clicked, an instruction is made by the client computer 103 (or the server computer 102) to the device selected in the source device selection column 3122 and the image input is started. Since the prescan is performed here, the image is more coarsely read out than the actual resolution and the obtained image is displayed as a preview image 3134 onto a display unit 3135. Upon displaying, the image is scale-displayed on a unit 3131 basis of the image area mentioned above.

If it is determined to be OK from the preview image here, by clicking a scan key 3137, the scan operation is started. Upon starting, a dialog to input a file name and a directory name for storing a scan file appears. After those names are input, by clicking an OK key, the scan image is stored. If it is determined to be NG from the preview image, the prescan is executed and the preview image is confirmed again. In the case of cancelling, a cancel key 3138 is clicked.

<Printer Driver Unit>

The printer driver will be described hereinbelow.

Figure 13:
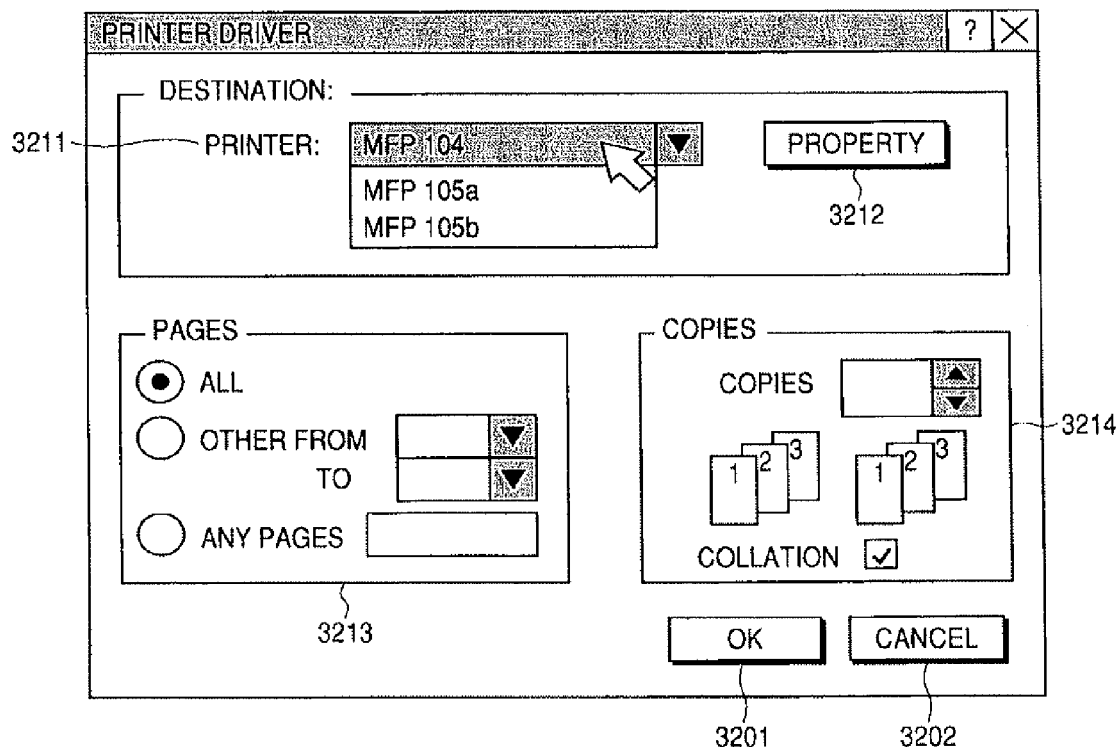
FIG. 13 is a diagram showing an example of the driver setting screen which can be displayed on the computer shown in FIG. 1.

FIG. 13 is a diagram showing an example of the driver setting screen which can be displayed on the client computer 103 (or 102) shown in FIG. 1 and corresponds to an example of the printer driver screen on the client computer 103 (or 102). By instructing the printer driver by a GUI (GUI which is displayed in the case where a display of a property regarding "printer" is instructed on the print setting GUI which is displayed in the case where the printing is instructed from the application or the like) for instructing the print operation, the user can instruct desired setting parameters and send the desired image to a transmission destination such as a printer or the like.

In a window of the printer driver shown in FIG. 13, reference numeral 3211 denotes a transmission destination selection column for selecting an output destination serving as a target. In the embodiment, the MFPs 104 and 105 shown in FIG. 1 become selection targets.

Reference numeral 3213 denotes a page setting column for selecting an output page from the jobs. In this column, the user determines which page in the image formed by application software that operates on the client computer 103 should be output.

Reference numeral 3214 denotes the number of copies setting column for designating the number of copies. By moving a pointer to this position and clicking an arrow (arrow of a scroll bar) shown, an increase or decrease in the number of copies can be set. Reference numeral 3212 denotes a property key which is instructed in the case of performing the detail setting regarding the transmission destination device selected in the transmission destination selection column 3211. By instructing this key, the display screen shown in each of FIGS. 14 to 16 is displayed on the LCD display unit 2200.

After completion of the desired settings, the printing is started by clicking an OK key 3201. In the case of cancelling it, the printing is stopped by clicking a cancel key 3202.

Figure 14:
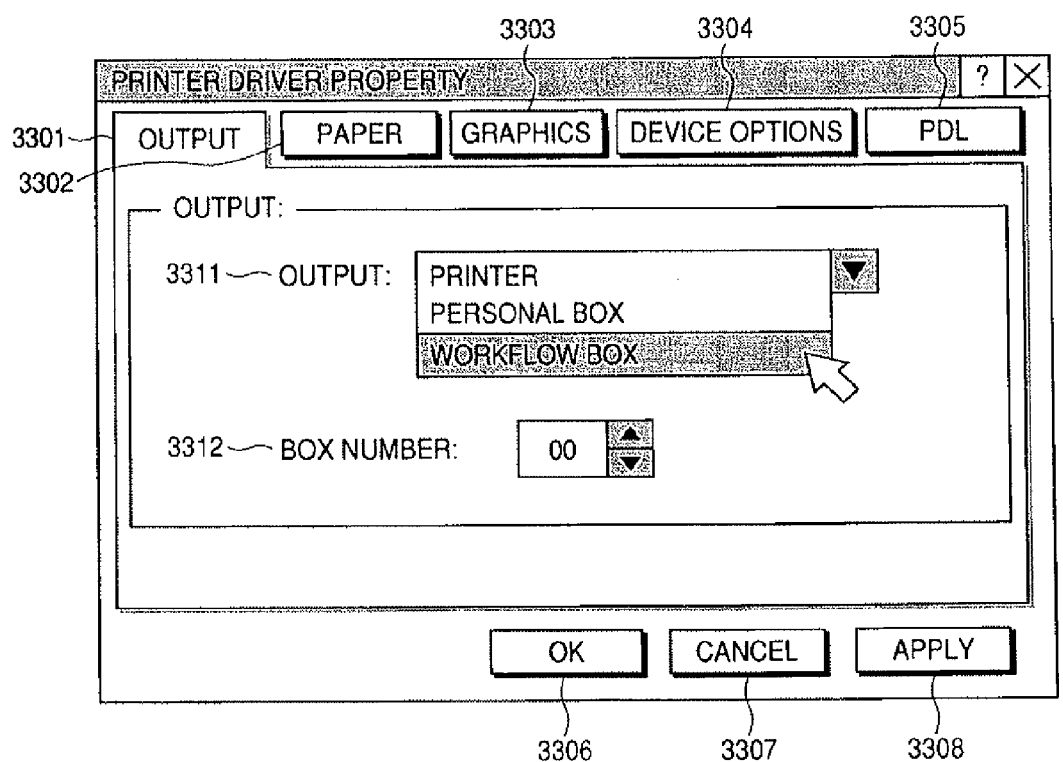
FIG. 14 is a diagram showing an example of a property screen (GUI) which is displayed when a property key shown in FIG. 13 is clicked.
Figure 15:
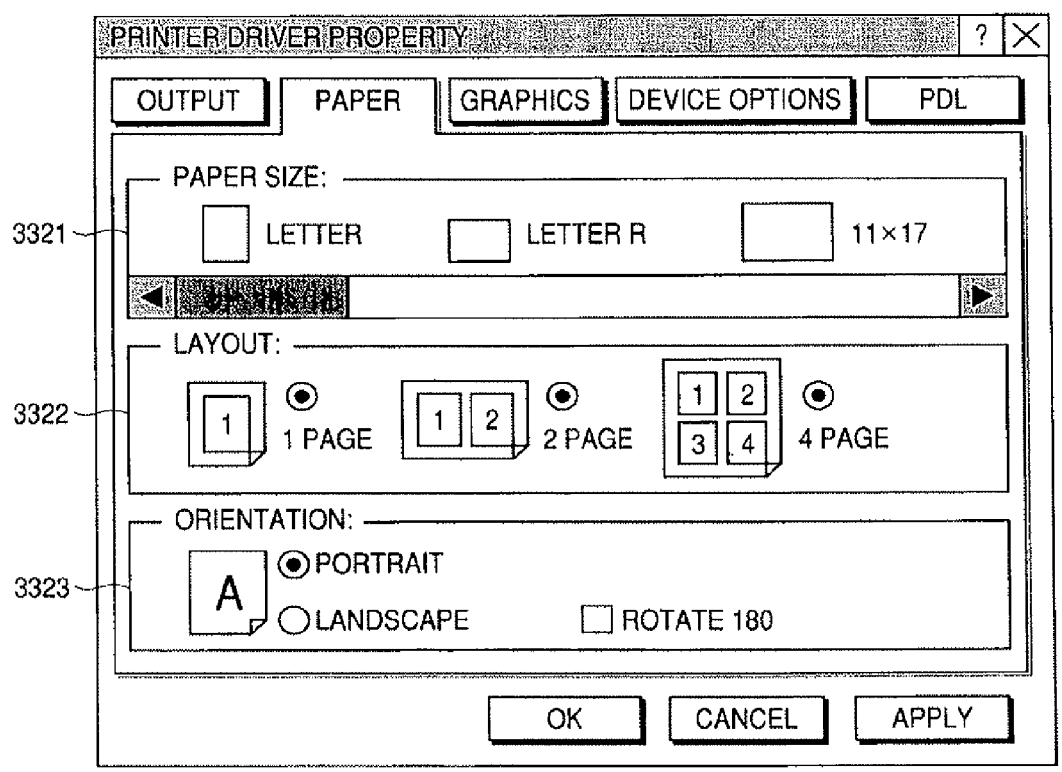
FIG. 15 is a diagram showing an example of the property screen (GUI) which is displayed when the property key shown in FIG. 13 is clicked.
Figure 16:
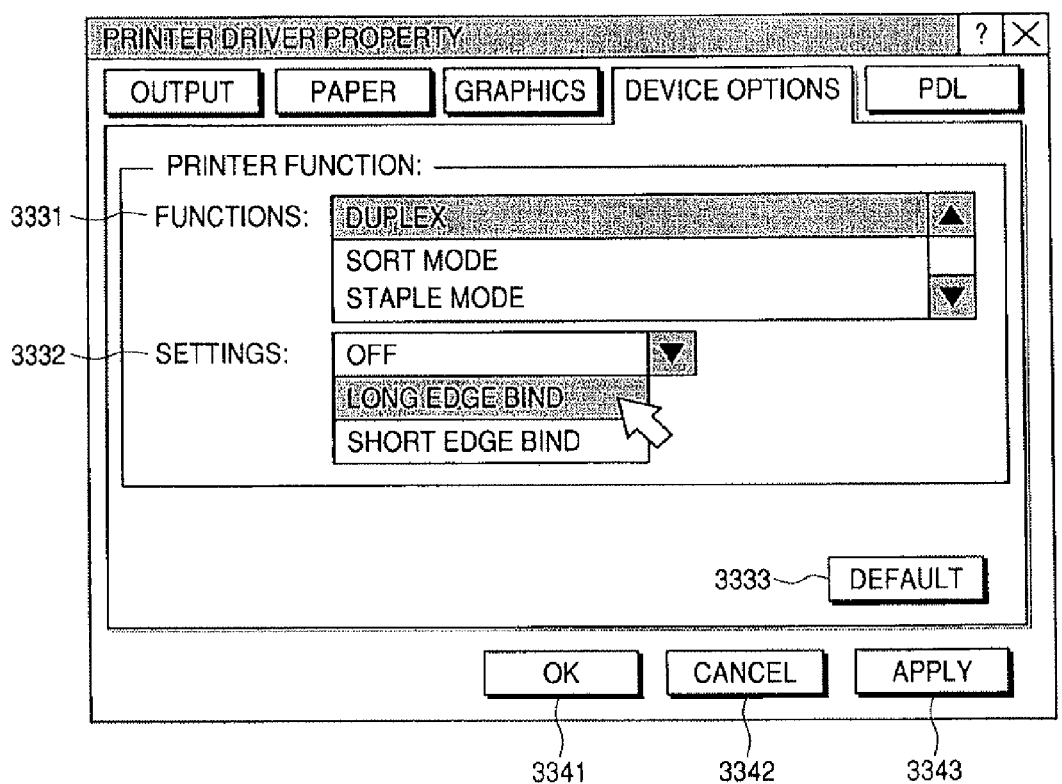
FIG. 16 is a diagram showing an example of the property screen (GUI) which is displayed when the property key shown in FIG. 13 is clicked.

FIGS. 14 to 16 are diagrams each showing an example of a property screen (GUI) which is displayed when the property key 3212 shown in FIG. 13 is clicked.

Those display screens are provided with tabs such as "Output," "Paper," "Graphics," "Device Options," "PDL," and the like. By clicking (instructing with a pointing device or the like (not shown)) them, different setting contents such as "Output," "Paper," "Graphics," "Device Options," "PDL," and the like can be set.

In the display screen shown in FIG. 14, the output destination can be selected from an output destination column 3311 and also thrown into a box besides the printer output. Besides the user box, there is also a workflow box, which will be explained hereinafter. If the user box or the workflow box is selected, the box number is also input. Reference numeral 3312 denotes a box number selection column and 3301 to 3305 indicate tabs mentioned above.

In the display screen shown in FIG. 15, a display example in the case where the "Paper" tab is selected is shown and a paper size, a page layout, an orientation of the paper, and the like can be set here. When the "Device Options" tab is selected, it is possible to make finer adjustment of processes regarding the image process so as to change set information peculiar to the device, for example, parameters such as setting of finishing like a staple or the like, a color hue by the printer, and the like.

As shown in FIG. 16, upon selection, functions 3331 and their set values (settings) 3332 are set to desired values, respectively. Reference numeral 3333 denotes a default key to return the set values to initial values.

Although not shown, similarly, in the "Graphics" tab, resolution and halftone can be set and in the "PDL" tab, an output format or the like of the PDL can be selected.

Further, reference numeral 3341 denotes an OK key. By clicking (instructing) this key, the property setting is validated and the display screen is return to the display screen shown in FIG. 14. Reference numeral 3342 denotes a cancel key. By clicking (instructing) this key, the property setting is invalidated and the display screen is return to the display screen shown in FIG. 12. Further, reference numeral 3343 denotes an apply key. By clicking (instructing) this key, the property setting is validated with the property screen held.

Ordinarily, the printer driver can input the set values or the like which appeared in the "Device Options" tab and are peculiar to the device. With respect to the set values peculiar to the device, generally, it is necessary to prepare a PPD (PostScript™ Printer Description) file or the like and set the printer driver.

Setting items to control the printer and their initial values or information showing permission or inhibition of a combination of the settings, and the like are described in the PPD file. The PPD file is provided as a file peculiar to every printer. The operator has to link the PPD and the driver and prepare them in his own computer every printer or cluster. It should be noted here that the PDP file one-to-one corresponds to the printer whose functions have previously been known.

A flow in the case where the job has been input from the printer driver will now be described with reference to a flow-chart shown in FIGS. 17A and 17B.

Figures 17, 17A:
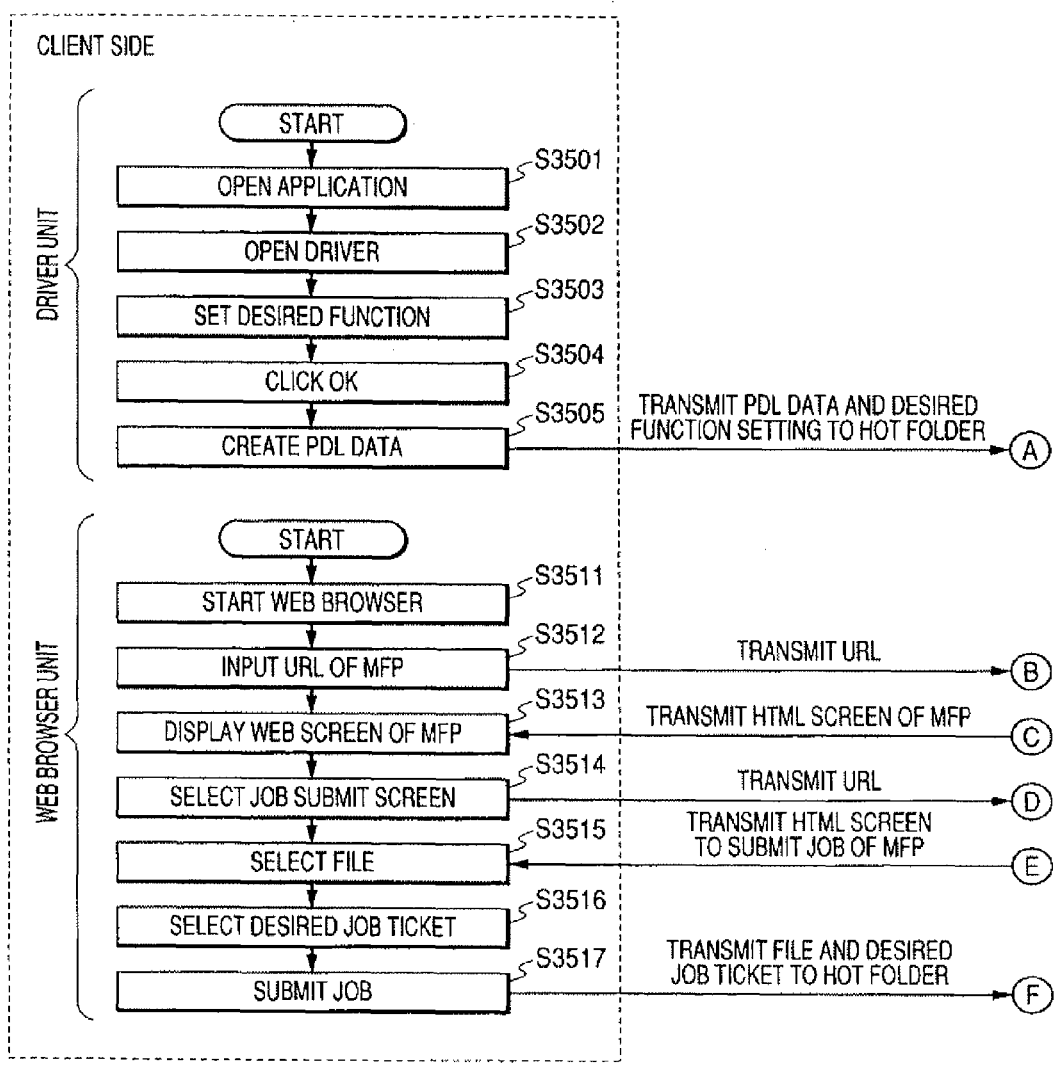
FIG. 17, which is composed of FIGS. 17A and 17B, is a flowchart of an example of a third data processing procedure in the image processing system according to the invention.
Figure 17B:
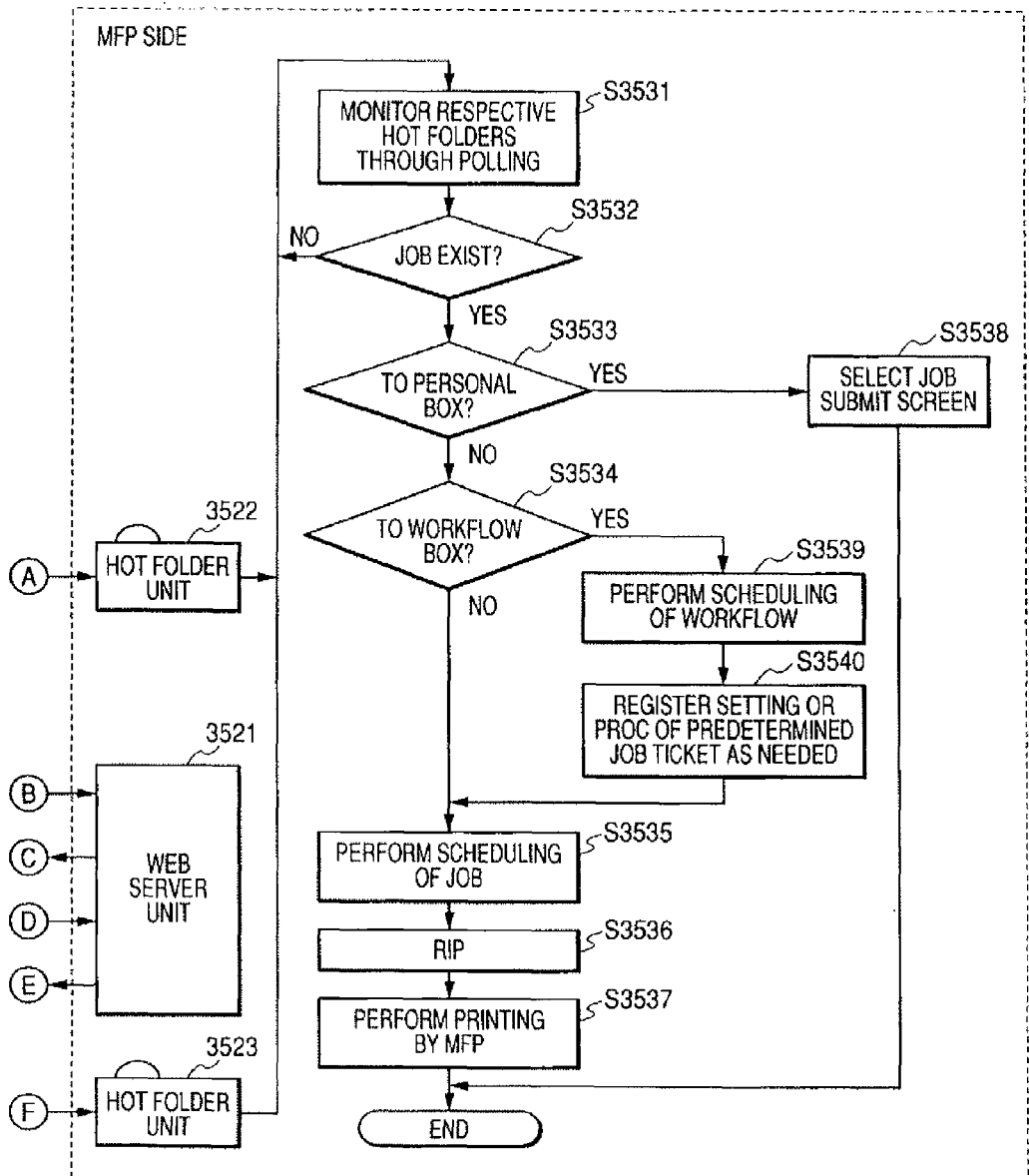

FIG. 17, which is composed of FIGS. 17A and 17B, is a flowchart showing an example of a third data processing procedure in the image processing system according to the invention and corresponds to, for example, a job processing procedure between the client and the MFP. S3501 to S3505 correspond to processing steps in the driver unit of the client side. S3511 to S3517 correspond to processing steps in the Web browser unit of the client side. S3531 to S3540 correspond to processing steps of the MFP side.

Steps S3501 to S3505 show such operations that the application is opened (S3501), the driver is opened (S3502), a desired function is set (S3503), and when the OK button is clicked (S3504), and the data is rewritten to PDL data (for example, PS data). The printer driver has roles for creating the PDL data and transmitting the data to a preset port of the MFP. In the client computer 103, this port is previously registered upon setting of the printer driver. That is, the printer driver which operates on the client side converts the print target data sent from the application into the PDL data and, thereafter, inputs it to the port prepared for the MFP 104 or 105 (it is temporarily held in a hot folder unit 3522 of the MFP side).

On the MFP side, a hot folder is prepared for the input job and the presence or absence of the file is always confirmed (S3531). If it is determined that the job exists (S3532), necessary processes are started.

At this time, whether or not the destination of the necessary processes is the user box (personal box) is discriminated (S3533). If it is determined that the destination is the personal box, the data is stored in the box unit 212 (S3538). The processing routine is finished.

If it is determined in step S3533 that the destination is not the personal box, whether or not the destination of the necessary processes is the workflow box is discriminated (S3534). If it is determined that the destination is the workflow box, functions or processes as will be explained hereinafter are scheduled (S3539). Settings or processes of a predetermined job ticket are registered as necessary (S3540) and the processing routine advances to step S3535 and subsequent steps.

If it is determined in step S3534 that the destination is not the workflow box, it is determined that the destination is the printer. The job is scheduled (S3535) in accordance with the set information (job ticket) of the job which has ordinarily been sent together. This job is analyzed and developed (RIP) into a raster image (S3536) and printed from the MFP 104 or 105 (S3537). The processing routine is finished. The processes in step S3511 and subsequent steps in FIG. 17, which is composed of FIGS. 17A and 17B, will be explained hereinafter.

<Web Server Unit>

A Web server program represented by, for example, IIS™ (Internet Information Services) of Microsoft Corporation in U.S.A. operates simultaneously in the MFP 104 or 105. In response to a call by an http protocol from the client computer 103 or the server computer 102, the current status of the MFP 104 or 105, the information of the job, and the like can be informed.

Figure 18:
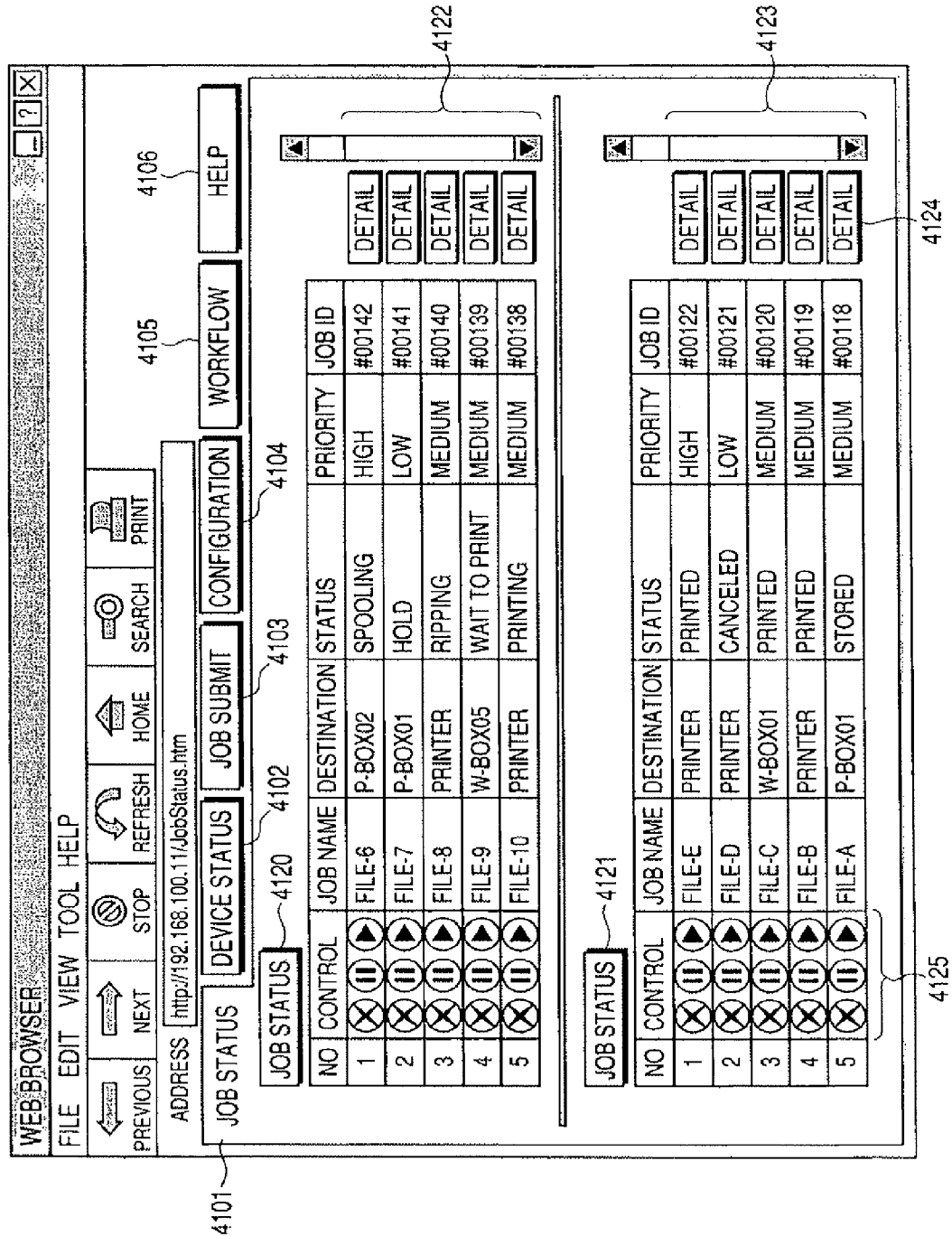
FIG. 18 is a diagram showing an example of a Web service screen provided in the MFP shown in FIG. 1.
Figure 19:
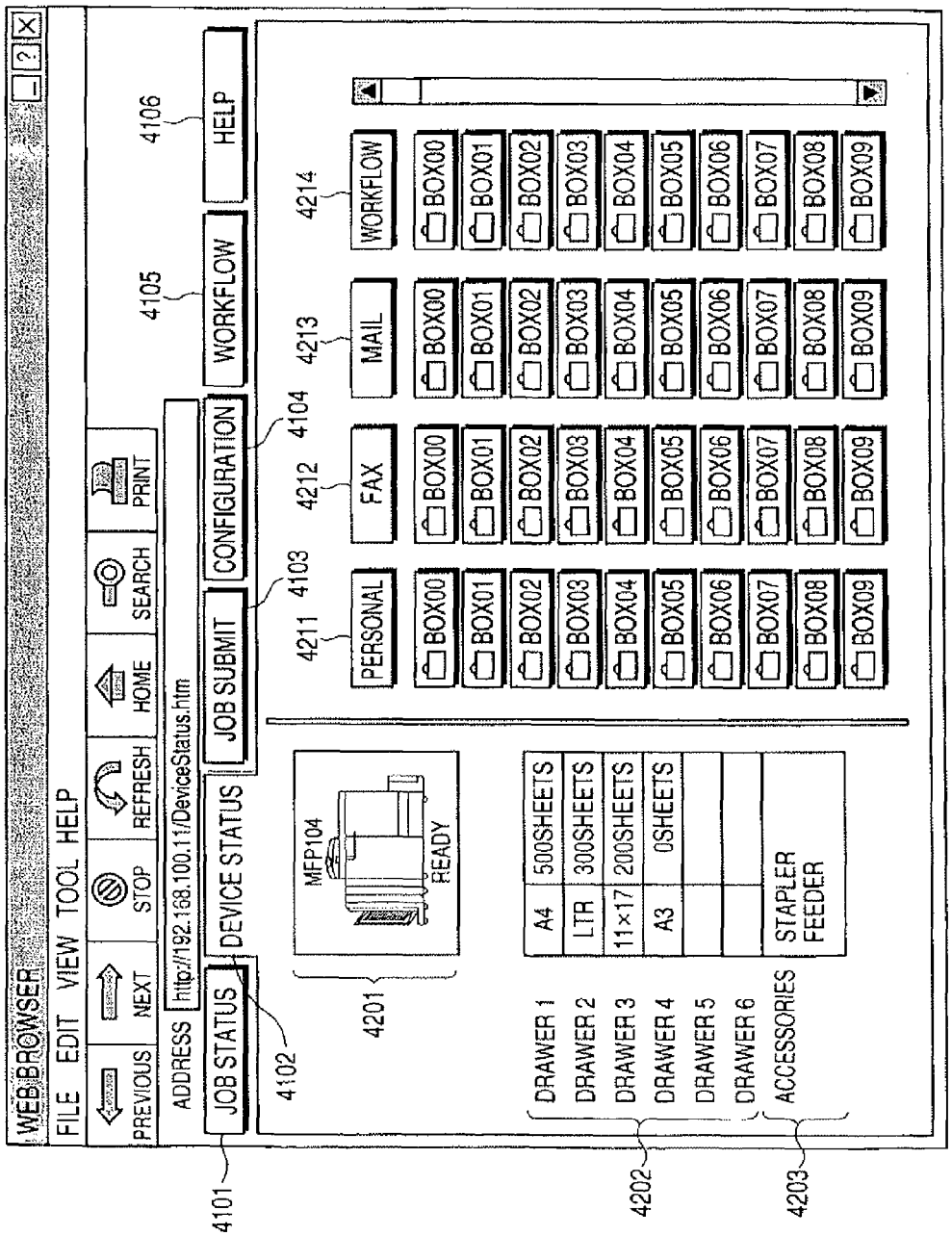
FIG. 19 is a diagram showing an example of the Web service screen provided in the MFP shown in FIG. 1.

FIGS. 18 and 19 are diagrams each showing an example of a Web service screen provided in the MFP 104 (or 105) shown in FIG. 1. The system has been preset in such a manner that when an IP address (for example, assumed to be "192.168.100.11" here. In the case of an environment in which a DNS is supported, a name of the MFP can be also used) of the MFP is input into a URL address unit, this service screen is read and a Web browser is activated and displayed in the display unit of the client computer 103.

This service tool is constructed by tabs of a job status 4101, a device status 4102, a job submit 4103, a configuration 4104, a workflow 4105, and a help 4106 in which a manual of this service has been inserted and will be sequentially explained from the job status.

<Job Status Tab 4101>

In FIG. 18, the job status tab 4101 is constructed by a job status display unit 4122 of active jobs and a job history display unit 4123. Since all active jobs cannot be displayed, they are displayed by clicking a key 4120 as necessary. All job histories can be referred to by clicking a key 4121. Detailed information of each job can be seen by clicking the detail key 4124.

Subsequently, in the job status display unit 4122, the status of each job in the MFP can be monitored and expressed by Spooling (the data before the RIP is being received), Ripping (under RIP), Wait to Print (under print standby), or Printing (under printing). The job to which the standby has previously been instructed in the MFP when the job is input is held as "Hold" in the state before the RIP of the data. When an error or a paper jam occurs, such a fact is displayed and notified to the user.

After the printing, the data is sent to the next job history (finished job). The MFP inquires the status of each network device at every predetermined period and/or when there is a change in its own status, each network device notifies the MFP of it, thereby coping with such a situation.

The operator can see the history of the job by the job history display unit 4123 and in the case where the processing routine is normally finished, "Printed" is shown. When the printing is cancelled on the way, "Cancelled" is shown.

<Device Status Tab 4102>

A standardized database called MIB (Management Information Base) has been constructed in a network interface unit in the MFP 104 or 105 or the printer 107. The system can communicate with computers on the network through a network management protocol called SNMP (Simple Network Management Protocol) and exchange necessary information such as statuses of the devices as well as the MFPs 104 and 105 connected onto the network with the server computer 102 or the client computer 103.

On the client computer 103 side, as shown in FIG. 19, the device status tab 4102 is opened, for example, it is possible to detect that the finisher unit 210 having which kind of function has been connected as equipment information of the MFPs 104 and 105, and as status information, whether or not the error or paper jam has occurred at present and whether or not the printer is in the state of printing, idling, or the like is detected. It is possible to obtain every static information such as equipment information of the MFPs 104 and 105, status of the apparatus, setting of the network, details of the job, management of the use condition, control, and the like (refer to a device status image 4201).

The document server fetches the statuses of the MFPs and the like by using the MIB at any time and updates them as an HTML file, thereby enabling the statuses to be always browsed by the client.

In FIG. 19, a paper size 4202 of sheets enclosed in the device which is managed by the MFP and a supplement condition of the sheets (a residual sheet amount in each sheet stacker or cassette) can be confirmed or an accessory condition 4203 of the finisher and the like equipped for each device can be previously confirmed by the tab showing the device status (device status image 4201).

The residual sheet amount is detected by a dedicated sensor. Since it is difficult to detect it at precision of one recording paper, the minimum unit at the time of the detection is set to, for example, about 10 sheets of paper. The absence of the paper can be certainly detected.

Further, reference numerals 4211 to 4214 denote a user box, a FAX box, an E-mail box, and a workflow box in the MFP, respectively, and a situation showing whether or not the jobs exist in those boxes can be known.

<Job Submit Tab 4103>

The Job submit tab will now be described with reference to FIG. 20.

Figure 20:
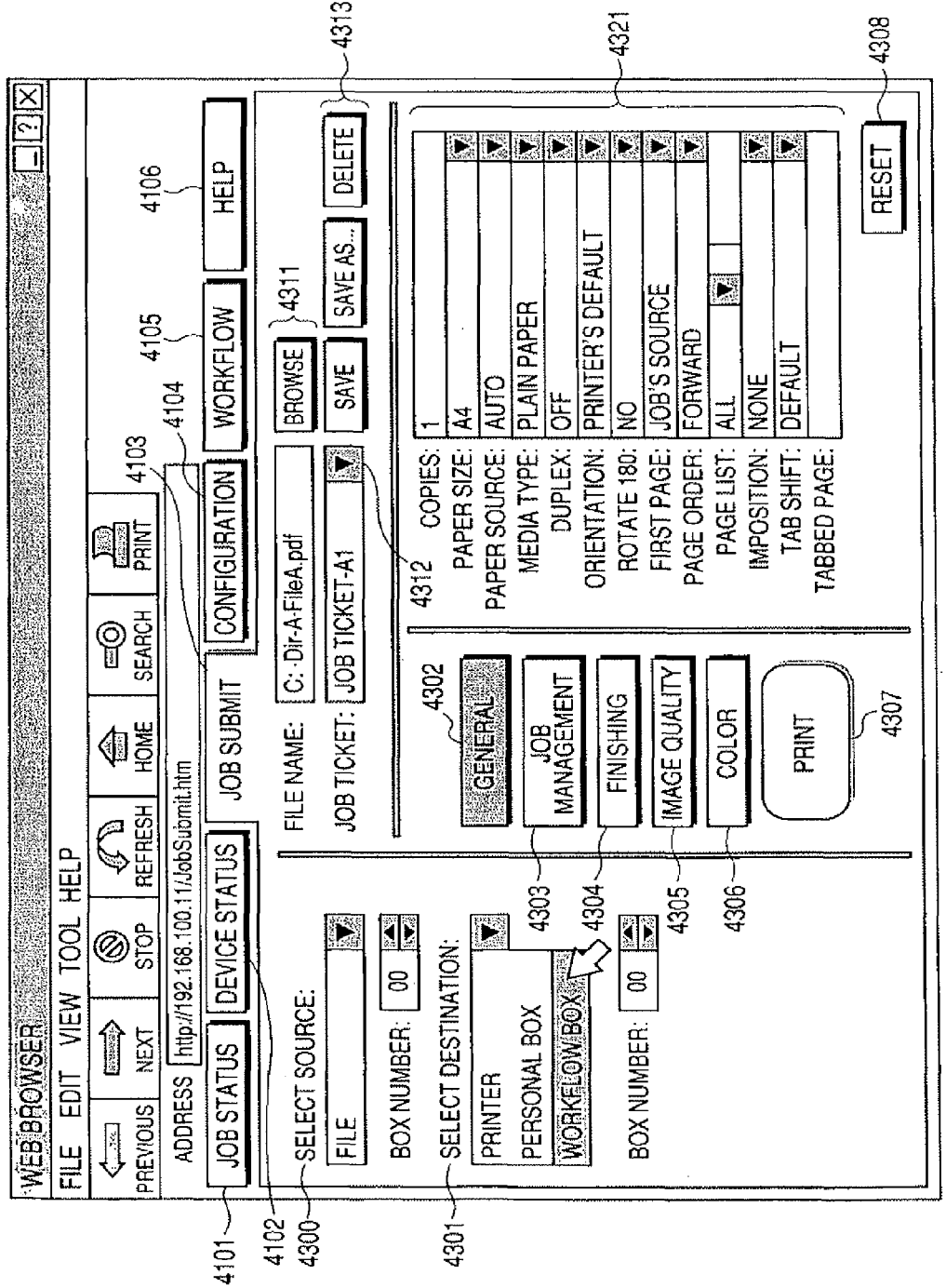
FIG. 20 is a diagram for explaining a detailed construction of a tab setting screen of a job submit shown in FIG. 18.

FIG. 20 is a diagram for explaining a detailed construction of a tab setting screen of the job submit shown in FIG. 18. Although its using method is similar to that of the printer driver mentioned above, this setting screen is used for directly inputting (the following additional information is attached to a document file as a print target and the resultant file is transferred or copied) the file on the client computer 103 into the MFP 104 or 105 without opening the application (without instructing to print on the application).

That is, the printer driver ordinarily has two roles. One of them is a role for activating the data by the application on the client computer 103 and converting it into the PDL data such as PostScript™ (or PCL) or the like and the other is a role for inputting the converted PDL data into the MFP 104 (or 105) (or the printer). This is because the conventional RIP process can cope with only one kind of RIP process.

However, on the other hand, although the job submit has only a role for inputting the job together with the job ticket by using the GUI, in recent years, an apparatus which can RIP-process data in various formats (for example, PDF, TIFF, JPEG, etc.) as well as PS by the same software RIP module has been proposed. There is also an apparatus which has a plurality of kinds of software RIP modules (for example, PS and PCL) in the MFP 104 (or 105) and can switch and use the RIP modules in accordance with the data. Even if not only one kind of PDL but also data in various formats (for example, PDF, TIFF, JPEG, etc.) or various PDL data are directly sent to the MFP 104 (or 105), they are RIP-processed and developed into bit map data in a manner similar to the conventional single PDL data.

In the case of the printer with the RIP processing function of the type which handles only the PS data instead of the bit map data because of convenience of the interface of the MFP 104 (or 105), the MFP 104 (or 105) develops the PS data into the bit map data by the RIP process and subsequently image-compresses the bit map data by JBIG or G4 (CCITT). After that, a header (header indicative of the PS data) such as PS or the like is added to the compressed data and the resultant data is output to the MFP. Consequently, it is also possible to realize the printing of the data in various formats for various printers.

As setting items which are added by the job submit, reference numeral 4300 denotes a select source column showing a location of the file serving as a source. In addition to the file on the client computer 103, the files in the user box and the like can be also set. Reference numeral 4301 denotes a select destination (transmission destination selection) column for selecting an output destination serving as a target.

Generally, although the target apparatus is the MFP 104 (or 105) or the printer 107 mentioned above, a cluster printer, which will be explained hereinafter, can be also set. Reference numeral 4311 denotes a select file column for selecting the file. Although the file name can be also directly instructed together with the directory, the job file in its own computer (or in the network) of the MFP is generally selected by a Browse button shown in a right position.

By clicking a print key 4307 after such a setup is performed, the set contents and the designated file are transferred to the MFP 104 (or 105) and added (queued) as a print job.

A print flow at this time corresponds to steps S3511 to S3517 shown in FIGS. 17A and 17B. When the Web Browser is activated in the client computer 103 or the server computer 102 and the URL of the MFP 104 (or 105) is set, the screen as shown in FIG. 20 is displayed. By clicking the print key 4307 after necessary items are input, the designated job is sent to a predetermined hot folder 3523. The sent job is processed in a manner similar to the file from the printer driver mentioned above.

<Job Ticket>

In FIG. 20, reference numeral 4312 denotes a column called a job ticket. It denotes a file in which setting items other than the image data of the job are collected together with the job.

In the embodiment, for example, the detailed setting items of each job ticket are classified into several groups as follows and various settings can be performed.

1. General setting (General): the number of copies, paper size, paper feeding stage, media type, presence or absence of the duplex mode, etc. (refer to a column 4321 shown in FIG. 20)

2. Job control (Job): priority of the job, presence or absence of the job save, etc. (refer to a column 4322 shown in FIG. 21)

3. Finishing (Finishing): staple, punch, booklet, etc. (refer to a column 4323 shown in FIG. 22)

4. Image processing setting (ImageQuality=IQ): sharpness, brightness, toner reduction setting, etc. (refer to a column 4324 shown in FIG. 23)

5. Color setting (Color): setting of a gamma conversion table, setting of an ICC profile, etc. (refer to a column 4325 shown in FIG. 24)

Since this job ticket has such an advantage that not only there are peculiar setting items in each device but also, the operation can be smoothly executed if they are prepared, besides the call key 4312 of the job ticket, as shown at 4313, there are a save key to hold the job ticket which has arbitrarily been set (in order to use the job ticket again), a save as key which can hold the job ticket by newly adding a name thereto, and a delete key to delete the job ticket. A reset key 4308 of the job ticket is also prepared in order to return the job ticket to a default state.

The setting of the job ticket for every setting item classified above will now be described. By clicking a finishing key 4304, a GUI shown in FIG. 22 is displayed. For example, ON and OFF are prepared in the setting column of staple. If it is set to ON, the job is stapled and output. If it is set to OFF, the job is output as it is. The system has such a mechanism that if the printer without the staple function is selected, this item itself is not displayed or ON cannot be selected.

The items of higher frequencies are prepared among the default setting items. In the case where the user settings are different from them, if the job ticket has been registered, they appear as defaults of the user himself.

The items which are set here are not limited to the general setting and the finishing function but, for example, when a job control key 4303 is clicked, the column 4322 in FIG. 21 is displayed in the position of the column 4321 and the setting for the job control can be performed. Similarly, if the finishing column 4304 shown in FIG. 20 is clicked, a display screen shown in FIG. 22 is displayed.

Similarly, if an image process key 4305 is clicked, a display screen shown in FIG. 23 is displayed. If a color key column 4306 is clicked, a display screen shown in FIG. 24 is displayed. Their parameters and the functions of the printer can be selected and changed.

When the print key 4307 in FIG. 20 is clicked after the desired setting is made, if the file of the print target set in the job submit 4103 and the job ticket have been set, the set contents are transferred to the MFP 104 (or 105).

<UI Constraints>

Restriction items corresponding to UI constraints in the PPD file of the printer driver can be provided for each setting item in those job tickets. The UI constraints is a function to avoid the inhibition setting by the GUI. For example, it is used to avoid that the user erroneously sets the duplex copy to an OHP sheet or, in the case of the printer with the staple sorter, such a process for stapling by group sort (output format in which the same pages are output like 111, 222, 333, . . . to each sort bin) is prevented on the GUI, or there is also a case where a combination which can give a damage to the printer side is prevented.

For example, generally, a paper jam is likely caused in the case where the printer is not designed so as to endure the paper whose paper path is small if the duplex copy mode is set to small paper whose size is equal to or less than the A5 size, a statement size, or the like.

According to such a function, if such an operation is repetitively executed, since a damage can be given to the printer side, when the user tries to execute such an operation, it is inhibited or prevented.

However, according to the UI constraints in the PPD file, although such an operation can be generally inhibited for two dimensions (combination of two functions), it is difficult to inhibit such an operation in the case of a three or more dimensions (combination of three or more complicated functions). However, since the job submit page is described by an HTML (Hyper Text Markup Language), even in the case of a combination of three or more functions, a restriction can be easily added. In the case of the general drivers which are provided by the PPD (for example, the drivers for Windows™ 95, 98, and Me made by Microsoft Corporation, the drivers made by Adobe Systems Inc.), restrictions are often previously added to the size capacity of the PPD. If the PPD is created so as to exceed the size capacity, a part of the functions of the UI constraints cannot be restricted. However, in the case of the HTML description, there is such an advantage that there is not particularly the size restriction.

<Configuration Tab 4104>

Figure 25:
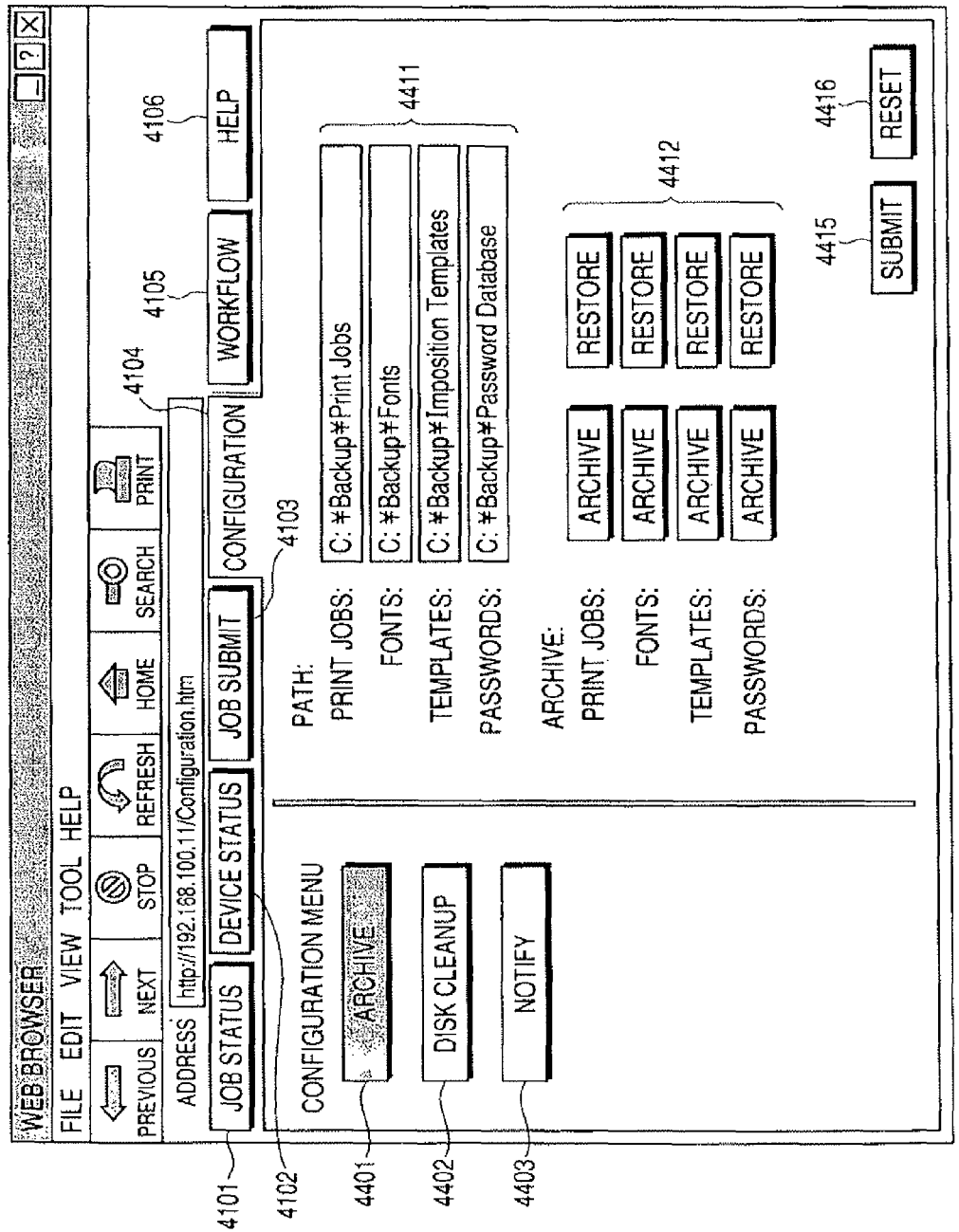
FIG. 25 is a diagram showing an example of a detail display screen of a configuration tab of a Web Browser screen shown in FIG. 18.
Figure 26:
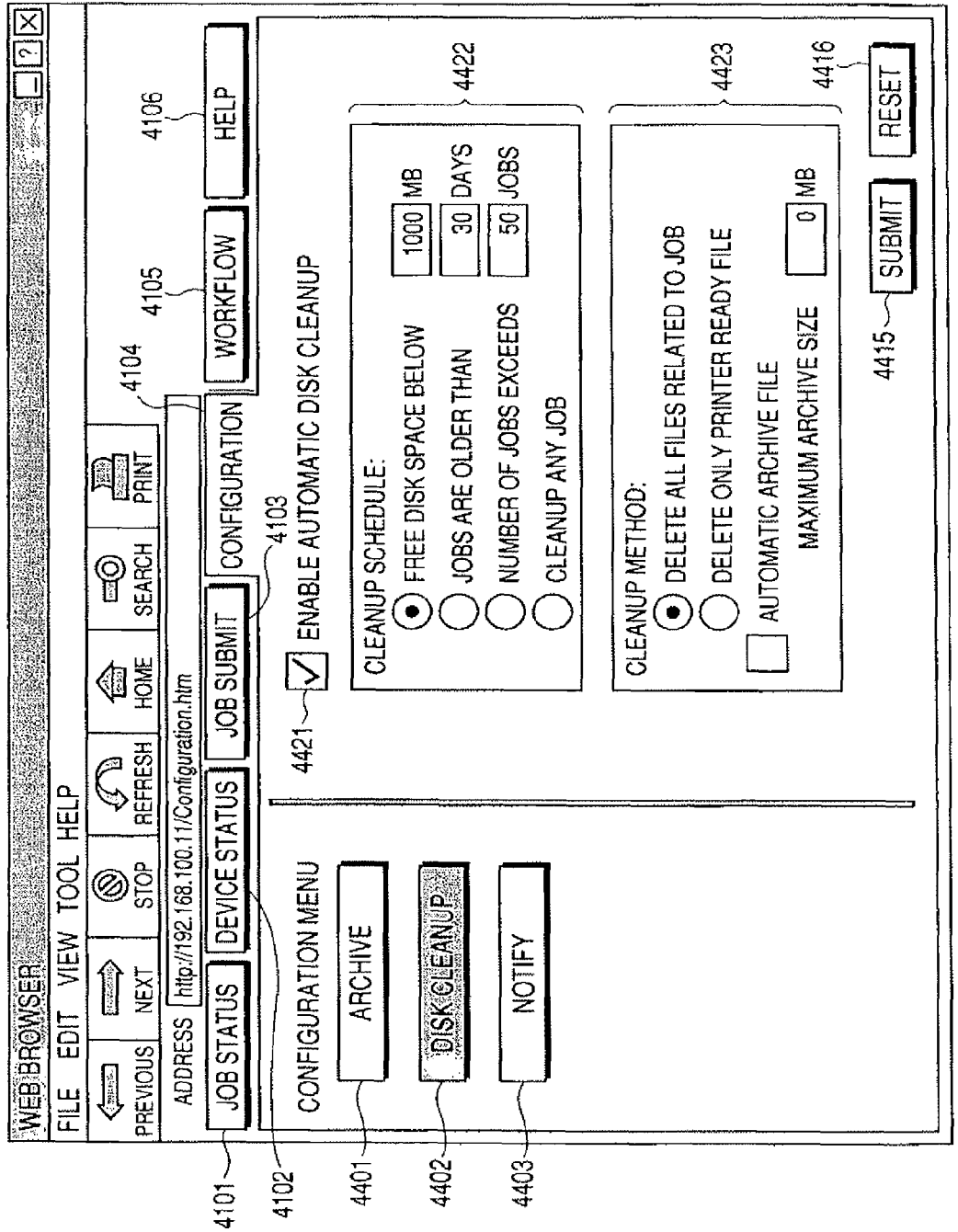
FIG. 26 is a diagram showing an example of the detail display screen of the configuration tab of the Web Browser screen shown in FIG. 18.
Figure 27:
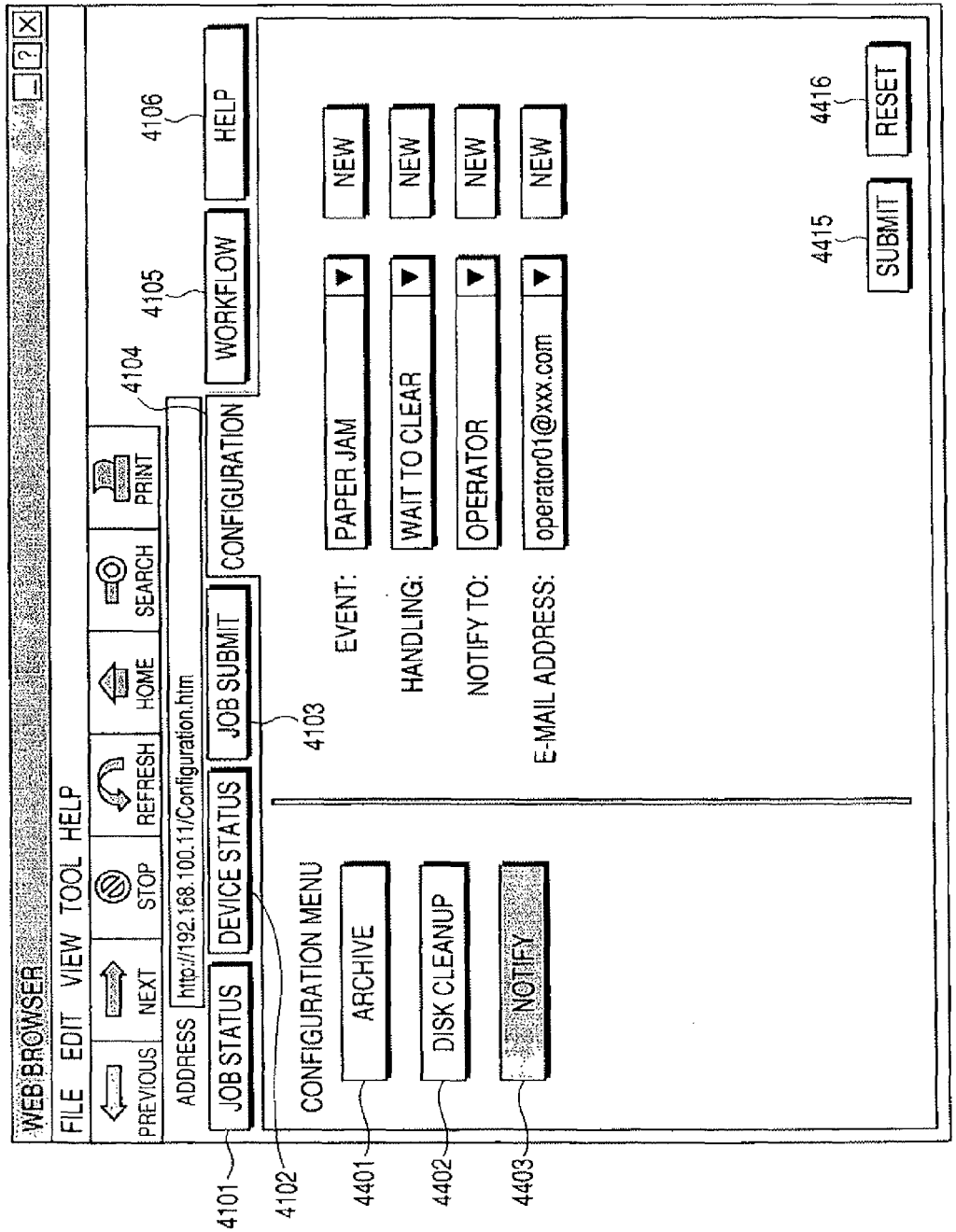
FIG. 27 is a diagram showing an example of the detail display screen of the configuration tab of the Web Browser screen shown in FIG. 18.

FIGS. 25 to 27 are diagrams each showing an example of a detail display screen of the configuration tab of the Web Browser screen shown in FIG. 18 and the same component elements as those in FIG. 18 are designated by the same reference numerals.

In FIGS. 25 to 27, reference numeral 4104 denotes the configuration tab constructed by an archive key 4401, a disk cleanup configuration key 4402, and an E-mail notify configuration key 4403. Each tab will be described hereinbelow.

<Archive Configuration>

The archive (data storage) of the job will now be described.

FIG. 25 shows an archive configuration GUI display screen. This screen appears when the archive key 4401 is clicked. Print jobs, fonts, templates for a page layout, and a password of the client user can be stored here. Reference numeral 4411 denotes a path setting of the directory for storing them.

Reference numeral 4412 denotes an archive and restore (calling of the stored data) key of each of them. With this key, data to be archived in the directory is designated and the data is written (archive) and read out (restore) into/from a readable/writable media such as file server, CD-R/W, or the like in the network.

<Disk Cleanup Configuration>

In FIG. 26, the key 4402 is a disk cleanup configuration for assuring a disk space in the MFP 104 (or 105). By clicking the key 4402, the GUI screen can be called.

Reference numeral 4421 denotes a check box for the setting to decide whether an auto disk cleanup function is valid or invalid. If this check box is marked, in other words, if this function is valid, buttons 4422 and 4423 appear. Reference numeral 4422 denotes a button for scheduling the cleanup and this button provides such a function that if an excessive number of jobs were held, the jobs are erased in accordance with the disk space, the number of days, or the number of jobs.

Reference numeral 4423 denotes a button for setting a cleanup method and this button provides such a function that it is possible to preset a mode to erase all related files, a mode to erase only a printer ready file of a large size, a mode to erase the files in accordance with the file sizes, or the like.

In FIG. 26, when the E-mail notify configuration key 4403 is clicked, the screen is switched to a GUI screen shown in FIG. 27 and the control is executed. An example in which a display screen for previously setting a contact address in the case where a certain event occurs by the E-mail address is shown here.

<Workflow Tab 4105>

Figure 28:
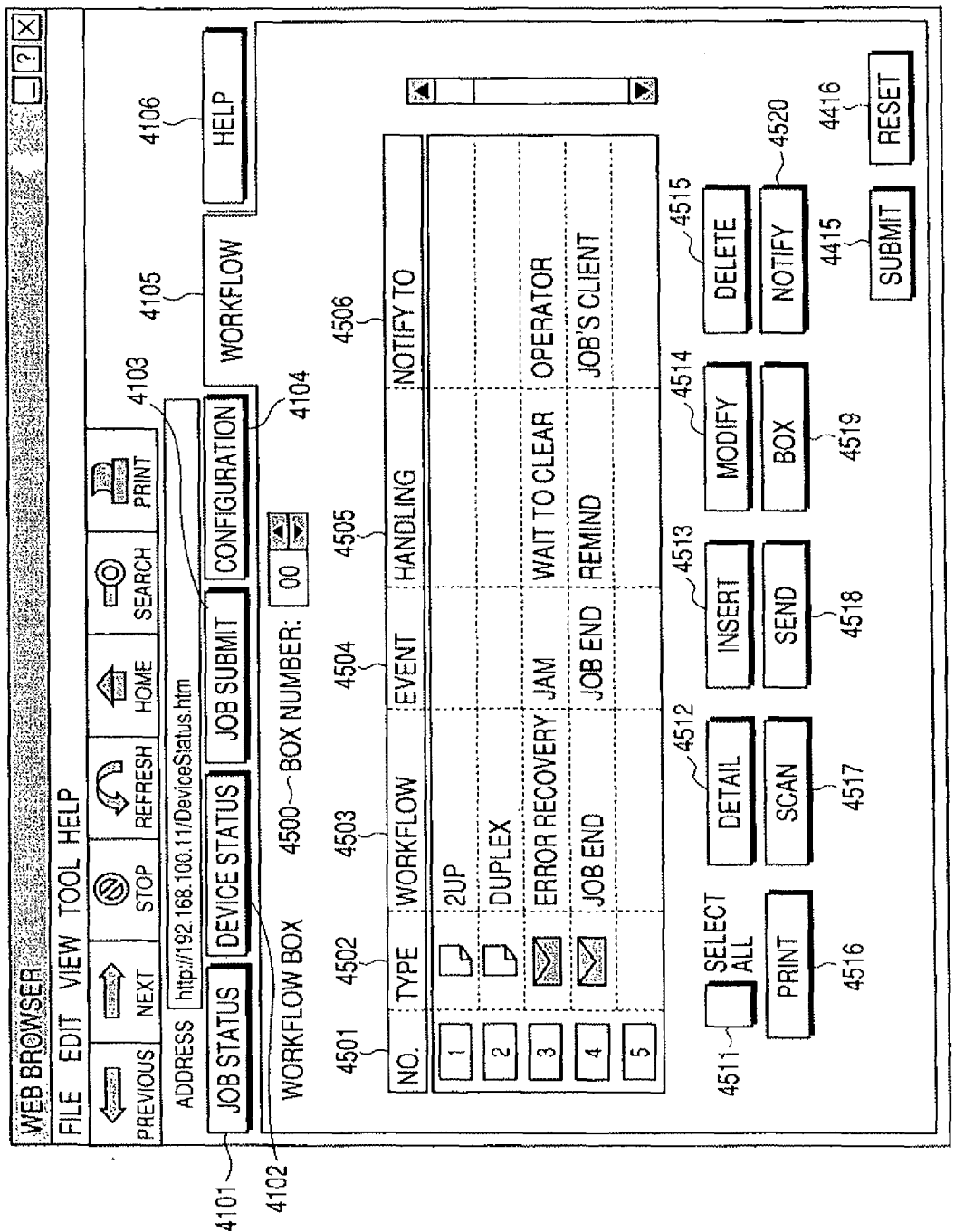
FIG. 28 is a diagram showing an example of a detail display screen of a workflow tab of the Web Browser screen shown in FIG. 18.

FIG. 28 is a diagram showing an example of a detail display screen of the workflow tab 4105 of the Web Browser screen shown in FIG. 18 and the same component elements as those in FIG. 18 are designated by the same reference numerals.

Since its operating method is almost similar to that of FIG. 18 except for a column to set a number 4500 of the workflow box in the display screen, the operation processes are omitted here.

Naturally, since the Web Browser merely displays the situation in the MFP, the contents set by the MFP operation unit can be confirmed and edited by the Web Browser of FIG. 28 and, contrarily, the contents set by the Web Browser can be also confirmed and edited by the MFP operation unit.

<Web Server and FTP Server>

In the case of using the HTTP protocol, the workflows have to be set in order in accordance with the predetermined pattern and its operability is slightly troublesome.

Therefore, not only the Web server but also the FTP server is arranged in parallel in the MFP 104 (or 105). For example, in the case of the IIS™ (Internet Information Services) of Microsoft Corporation, there is a WWW Publishing Service as a Web server and there is an FTP Publishing Service as an FTP server. Both of those services are validated.

The workflow boxes are prepared in the access directory of the FTP server and a security level, write permission, and the like are preset as necessary, thereby enabling them to be accessed from the client computer 103 side. A link is connected from the Web Browser page as shown in FIG. 28, thereby enabling the page to be easily transferred to the FTP page.

<Creation of Workflow>

FIGS. 29 to 35 are diagrams schematically showing a transition example of a workflow creation operation screen in the data processing apparatus according to the invention. Each arrow shown by a curve in the diagram indicates a locus of a pointing device and corresponds to the state where, for example, the user properly traces on the folder by a continuous instruction.

The workflow order denotes a series of flows of the operation regarding a predetermined work (including operating order). In the embodiment, a series of flows of the instructions to the apparatus which have previously been standardized in accordance with the work contents is also referred to as a workflow.

In those diagrams, first, a file 5102 is selected by a pointer 5101. At this time, it is continuously selected by the pointer 5101 so as not to release the file (dragging state is maintained). For example, when the pointing device is constructed by a mouse, the file is clicked by the left button (if the button is designated to an object select button and it has been customized, it can be replaced with the right button) and the file is moved while pressing the button.uchiwa In the case of Windows™ of Microsoft Corporation in U.S.A. or LinuxOS, for example, the left button of the mouse can be used or the file can be also selected by the right button. Even in the case of other OSs or a pointing device other than the mouse, the mechanism itself for moving the file in the selection state is not changed.

Subsequently, the file is continuously moved in the selection state as if the user traced on a desired box like a track TR shown by a dotted curve in FIG. 29.

Although the box mentioned here is ordinarily called a folder in the case of the OS, a case where it is made operative on the operation unit of the MFP or a case where it is made operative on the application is also presumed and the folder is expressed as a box in consideration of all cases. Icons and the like other than the folders can be also applied to the scope of the invention.

Figure 30:
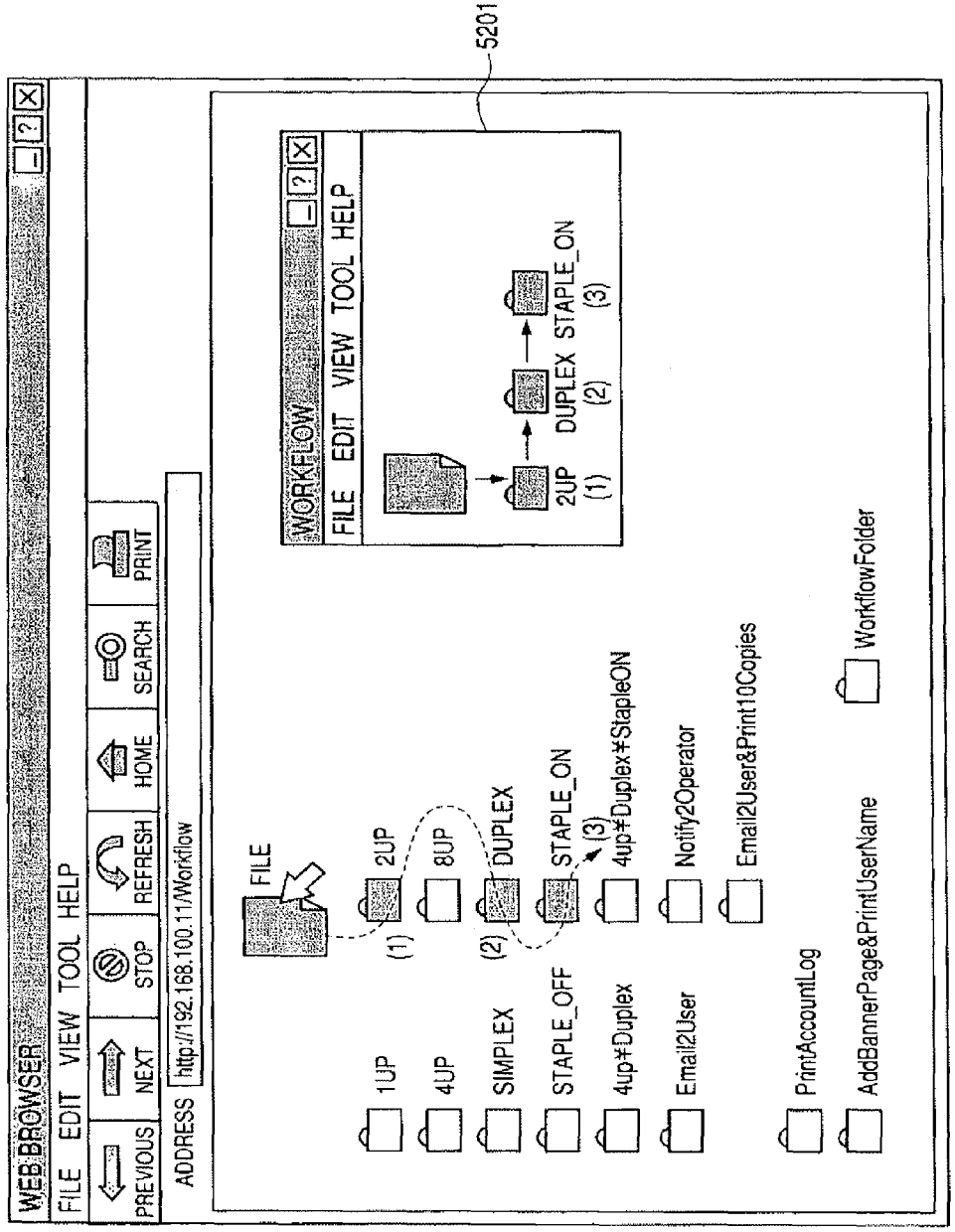
FIG. 30 is a diagram schematically showing an example of transition of the workflow creating operation screen of the data processing apparatus according to the invention.

In this instance, as shown in FIG. 30, a workflow window 5201 appears as a subscreen and the boxes which were passed along the track drawn by the user himself appear in order in the workflow window. That is, when the track TR passes in order of (1) a 2up folder, (2) a duplex folder, and (3) a staple folder, icons of the boxes also appear simultaneously in the workflow window 5201 in order of (1) 2up, (2) duplex, and (3) staple.

It is also possible to arbitrarily construct in such a manner that when the folder icon passes, the boxes appear in the workflow window and, at the same time, also in a main window, the display is controlled so as to change the colors of the boxes which were already passed or the display is controlled so as to add a mark indicating that the box has been passed, thereby enabling such boxes to be visually recognized.

Figure 31:
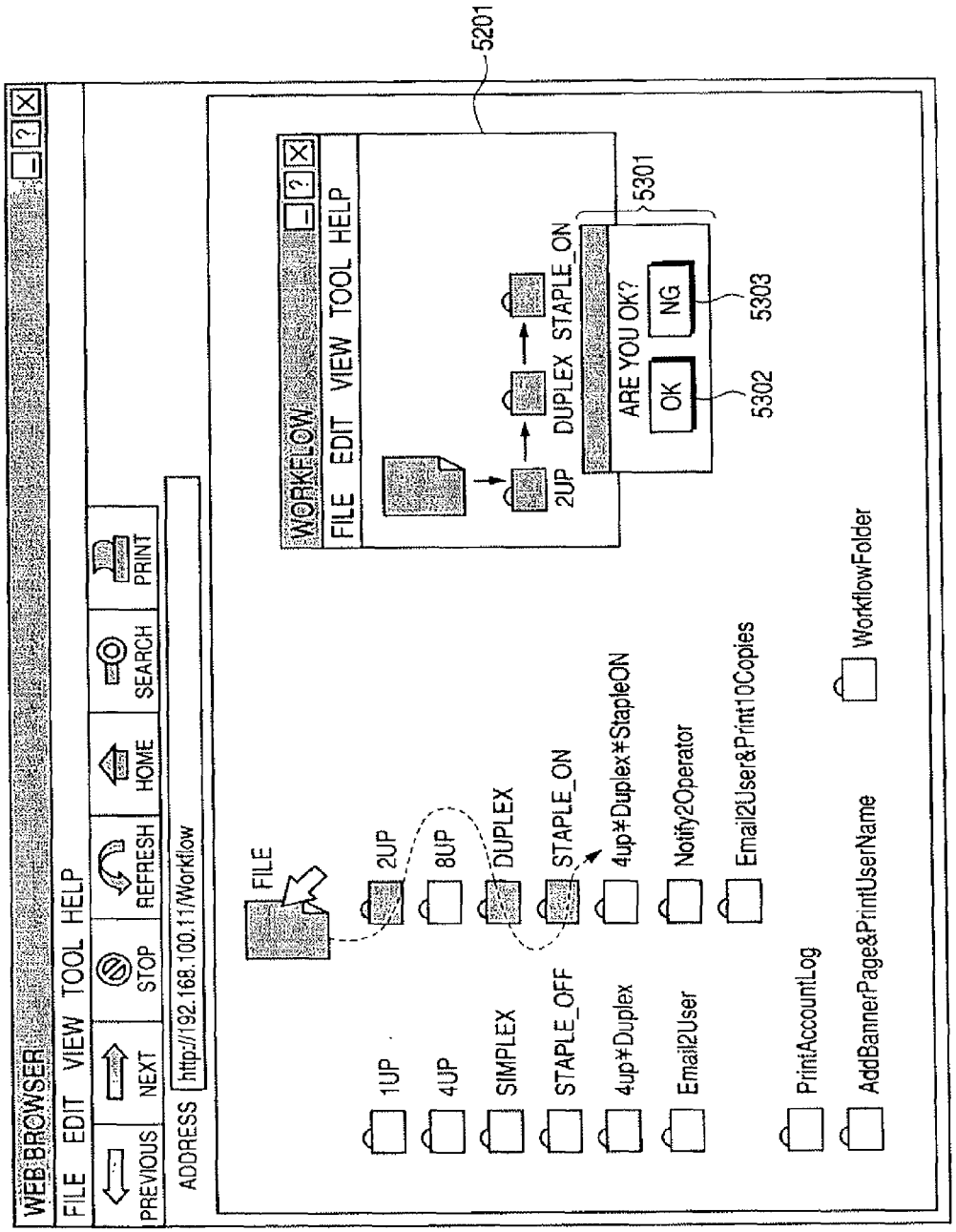
FIG. 31 is a diagram schematically showing an example of transition of the workflow creating operation screen of the data processing apparatus according to the invention.

When the operation to release the selected file is executed by the pointing device after the box (folder) of (3) staple was passed, a flow end confirmation screen 5301 appears simultaneously as shown in FIG. 31. If the flow is finished, the flow creation is finished by clicking an OK key 5302 by the pointing device (not shown). If the file is valid, the processing routine is started as it is by the flow formed now.

If an NG key 5303 shown in a display screen of FIG. 31 is clicked, the flow can be corrected in the workflow window (that is, a correction mode can be executed). The flow creation is finished in a manner similar to the OK key 5302 at the end point of the correction and the processing routine is started.

When the user wants to interrupt the processing routine, the folder creating process can be also forcedly finished by waiting for an operation instruction of a cancel button (not shown).

<Correction, Inhibition, Branch of Workflow>

Figure 32:
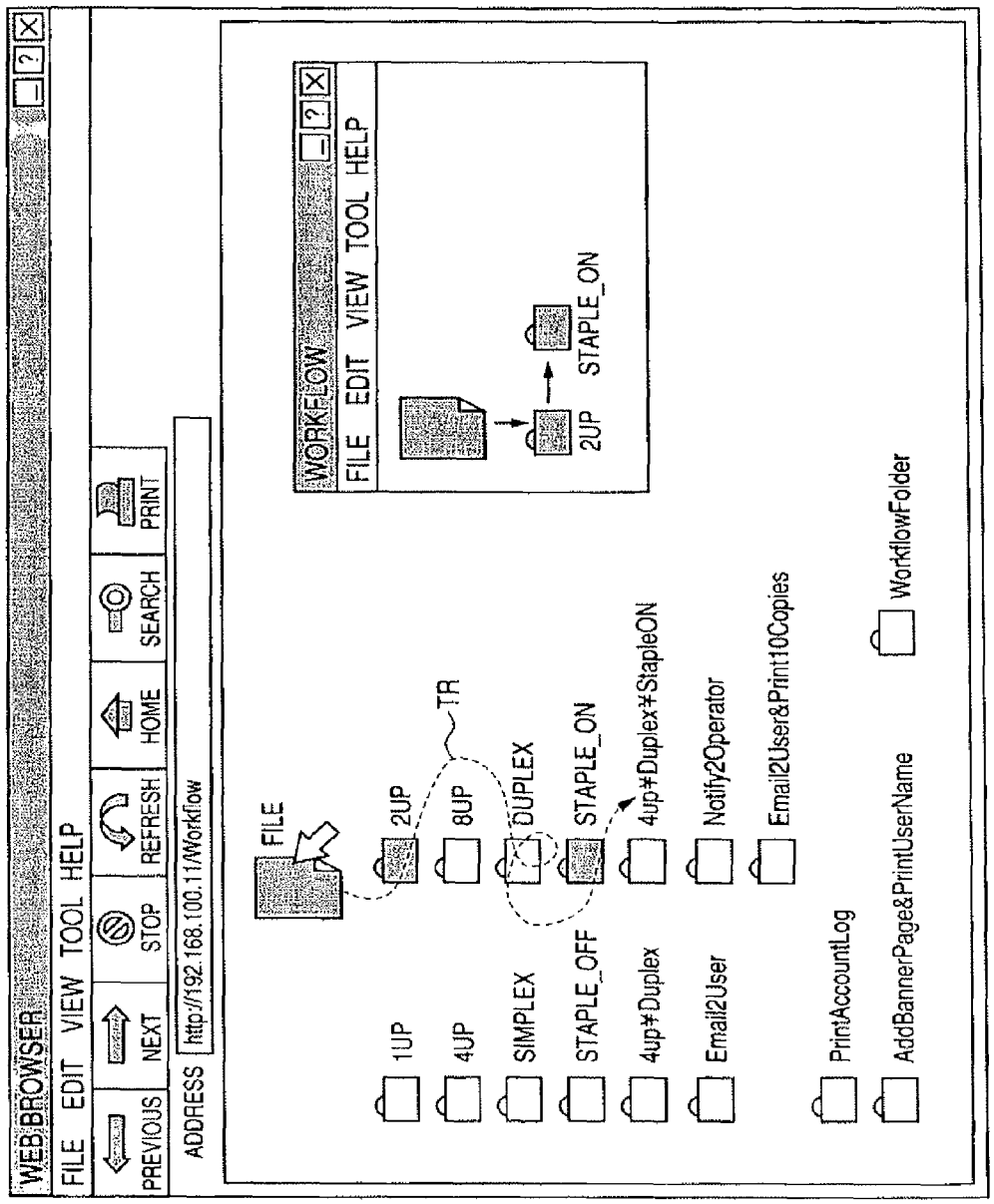
FIG. 32 is a diagram schematically showing an example of transition of the workflow creating operation screen of the data processing apparatus according to the invention.

If the user further wants to correct the flow, as shown in FIG. 32, for example, when the duplex box is passed twice continuously, that is, although the track TR crosses in the example of FIG. 32, even in another instructing state, when the duplex box is passed twice continuously, even if the file erroneously passed the formed flow (duplex box) subsequently to the 2up folder, such a selecting state can be cancelled.

At this time, in the main window, there is executed display control to return the colors of the boxes whose colors were changed due to the passage to the original colors or display control to cancel the mark showing that the file has passed the boxes if any (it is assumed that the CPU on the client computer 103 side controls by referring to a relation table between indication coordinate information of the pointing device and folder location information which has previously been registered).

Specifically speaking, for example, when 2up is selected, naturally, 1up, 4up, and 8up cannot be selected. When the duplex printing is selected, naturally, the simplex printing cannot be selected (it is assumed that they have exclusively been set by folder selection relation table (not shown)). Therefore, a table is formed in such a manner that the pointer 5101 erroneously and previously collects the boxes of the same function into a group and exclusively handles them by the operation of the pointing device, when the pointer passes through 2up, as shown in FIG. 33, the passage through 1up, 4up, and 8up is inhibited (a passage inhibit icon is additionally displayed in a predetermined position of the folder) or an exclamation mark (!) is additionally displayed, thereby making it possible to warn the erroneous operation for the folder selecting operation by the user.

Figure 33:
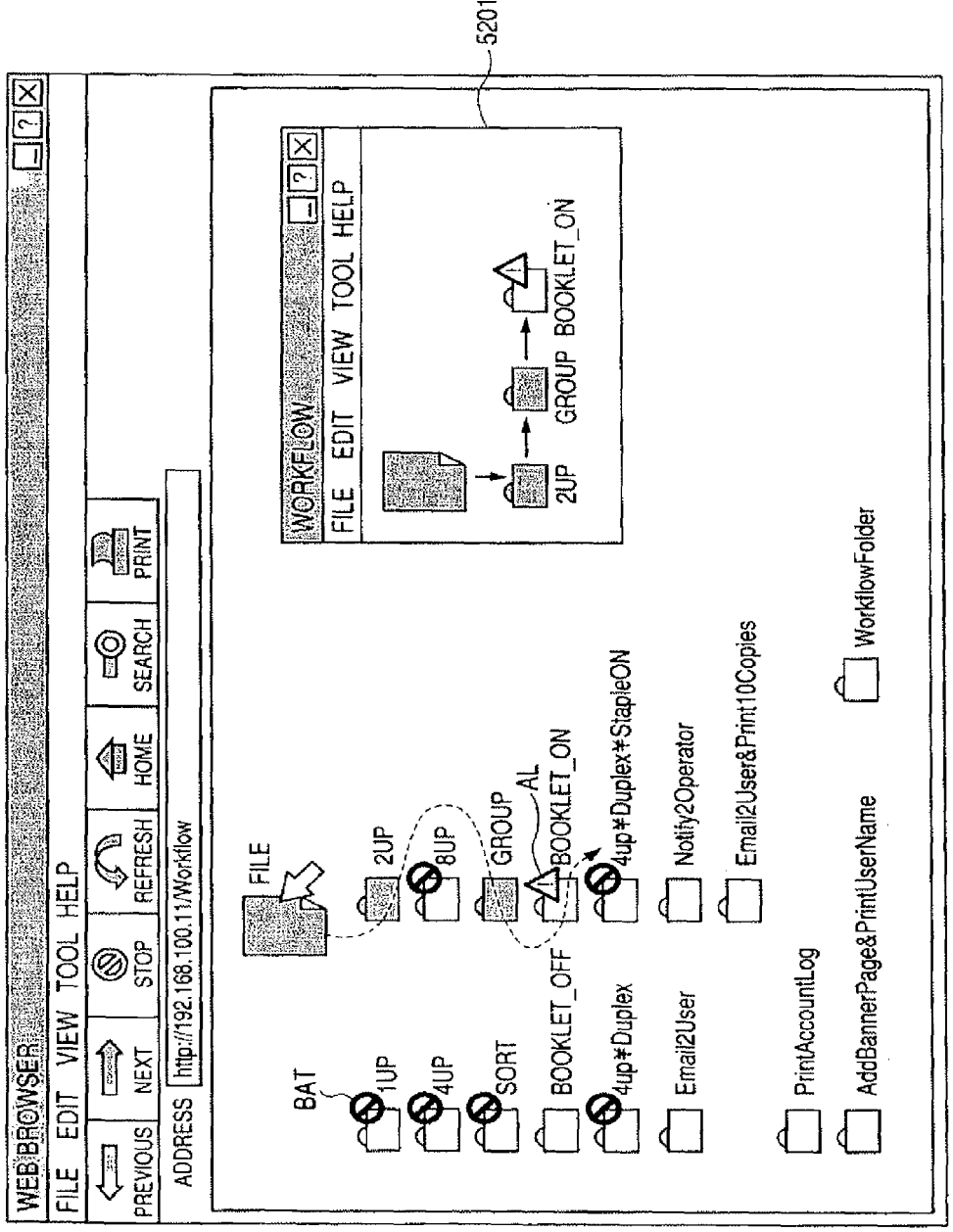
FIG. 33 is a diagram schematically showing an example of transition of the workflow creating operation screen of the data processing apparatus according to the invention.

FIG. 33 shows a case of an example in which since 2up and (1up, 4up, and 8up) are exactly exclusive in the case of, a passing inhibit mark icon BAT is added to 1up, 4up, and 8up or the colors of the boxes are changed. However, in the case of a group sorting function and a booklet function, although they are not always functionally exclusive, since their combination is unnatural, display control for adding the exclamation mark (!) AL to the boxes in the main window and/or the workflow window 5201 is executed, thereby coping with the state where the user is visually urged to pay attention to the present operation.

Figure 34:
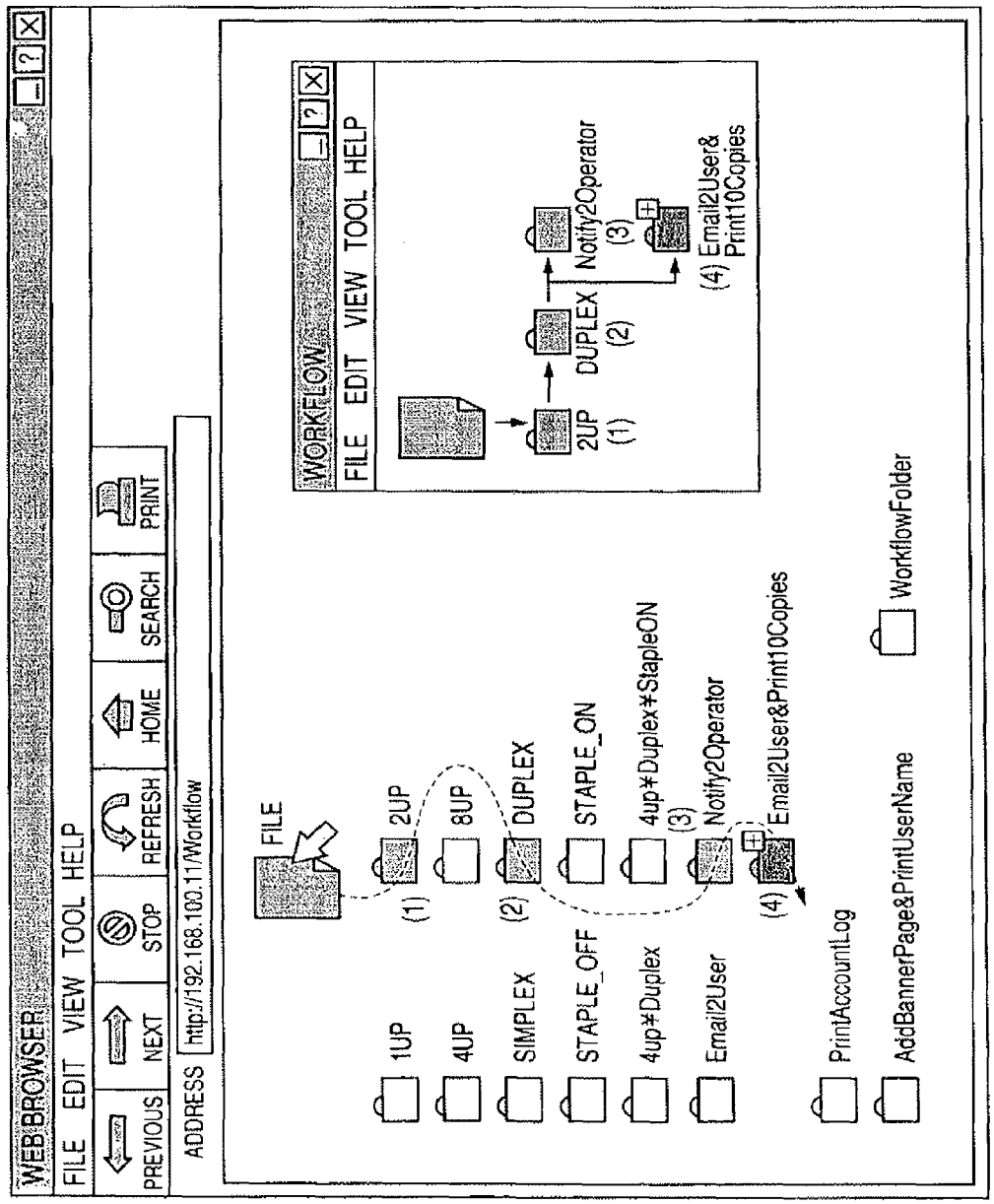
FIG. 34 is a diagram schematically showing an example of transition of the workflow creating operation screen of the data processing apparatus according to the invention.
Figure 35:
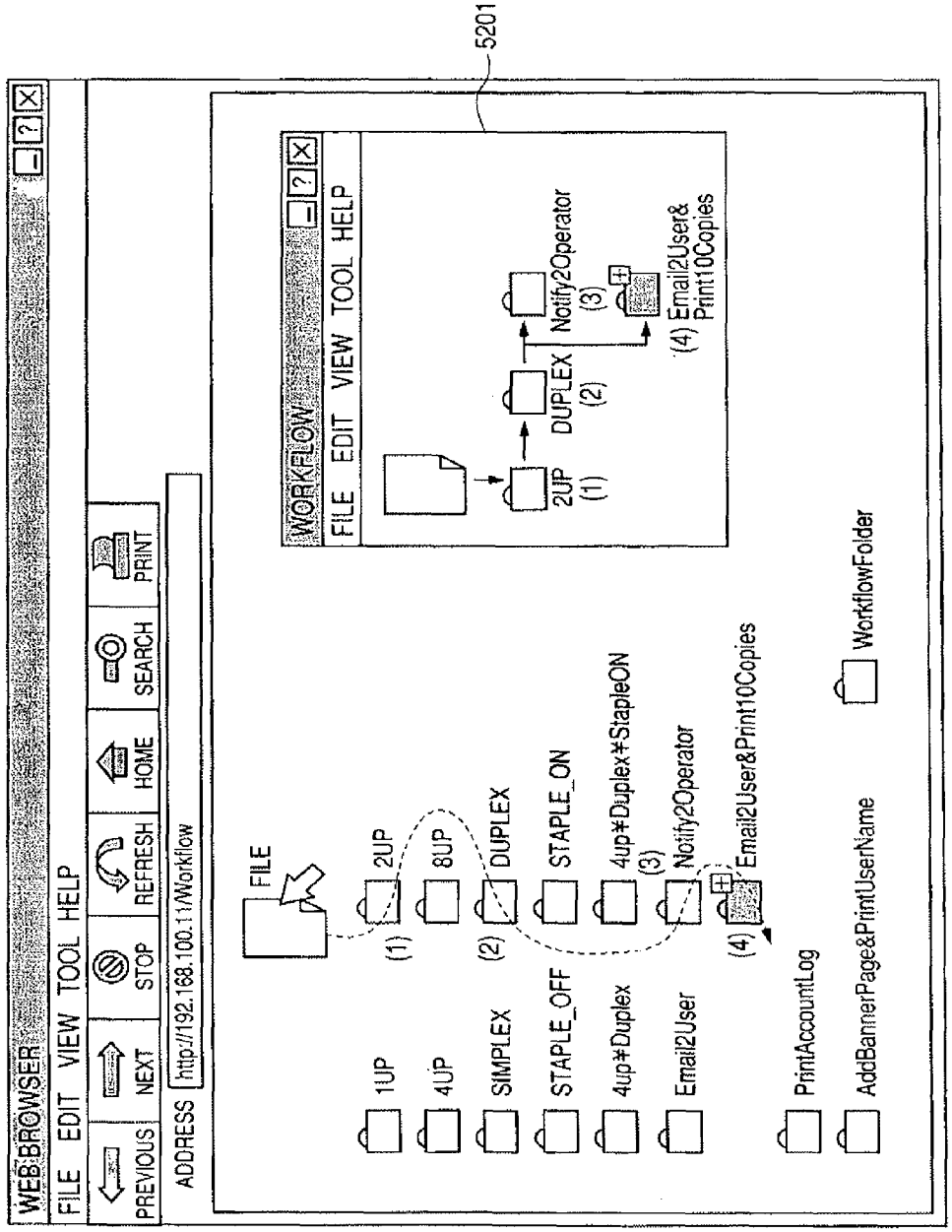
FIG. 35 is a diagram schematically showing an example of transition of the workflow creating operation screen of the data processing apparatus according to the invention.

Since a branch is sometimes necessary for the workflow, in the case of passing through the boxes in the portion to be branched as shown in FIGS. 34 and 35 (for example, between (3) and (4)), the file is allowed to pass from a keyboard (not shown) while pressing a shift key or a control key (in the case of the Windows™ OS, a function key or an ALT key, in the case of the Macintosh™ MacOS, a command key or the like can be also used), or the like.

At this time, display control to add branch marks (+marks in the example shown in FIG. 35) to the boxes in the main window is executed or display control to change the colors is executed, thereby enabling those boxes to be visually recognized. At the same time, addition of the branch mark, the color change, or the like is also performed to the workflow window 5201.

<Flow to Create the Workflow>

Figures 36, 36A:
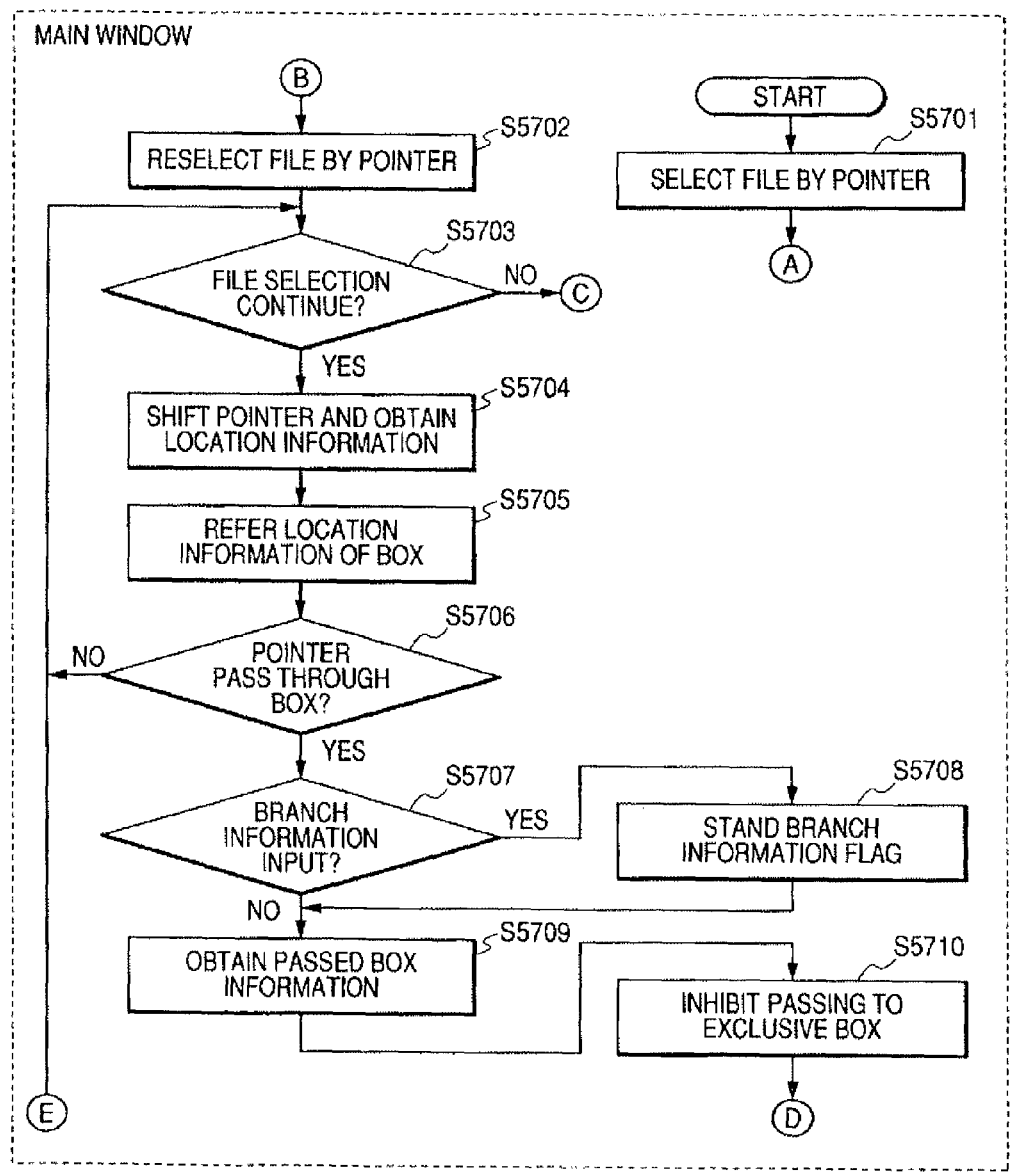
FIG. 36, which is composed of FIGS. 36A and 36B, is a flowchart of an example of a fourth data processing procedure in the data processing apparatus according to the invention.
Figure 36B:
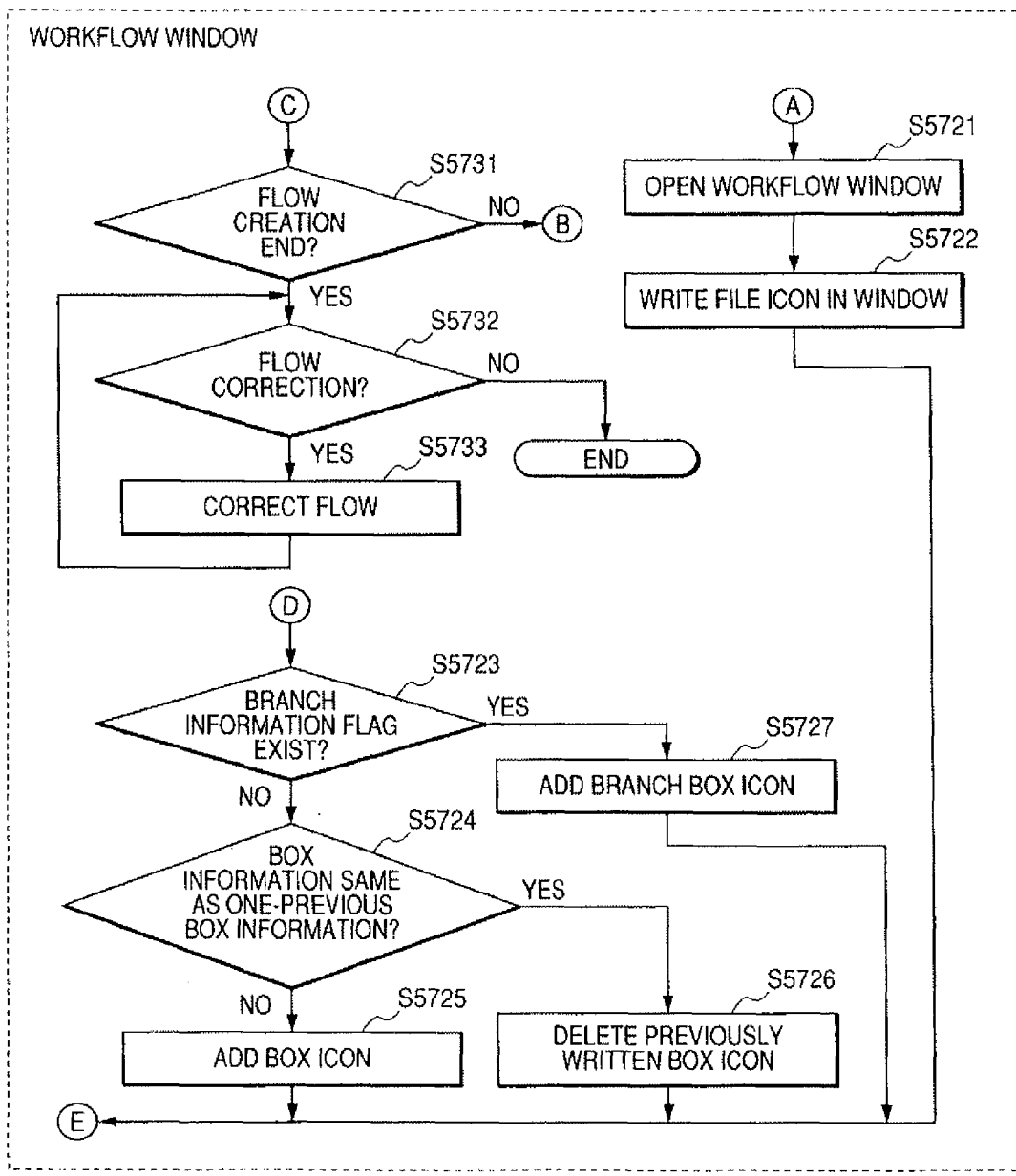

FIG. 36, which is composed of FIGS. 36A and 36B, is a flowchart showing an example of a fourth data processing procedure in the data processing apparatus according to the invention and corresponds to an example of the workflow creation processing procedure. S5701 to S5710 denote processing steps of the main window and S5721 to S5727 and S5731 to S5733 denote processing steps of the workflow window.

Figure 29:
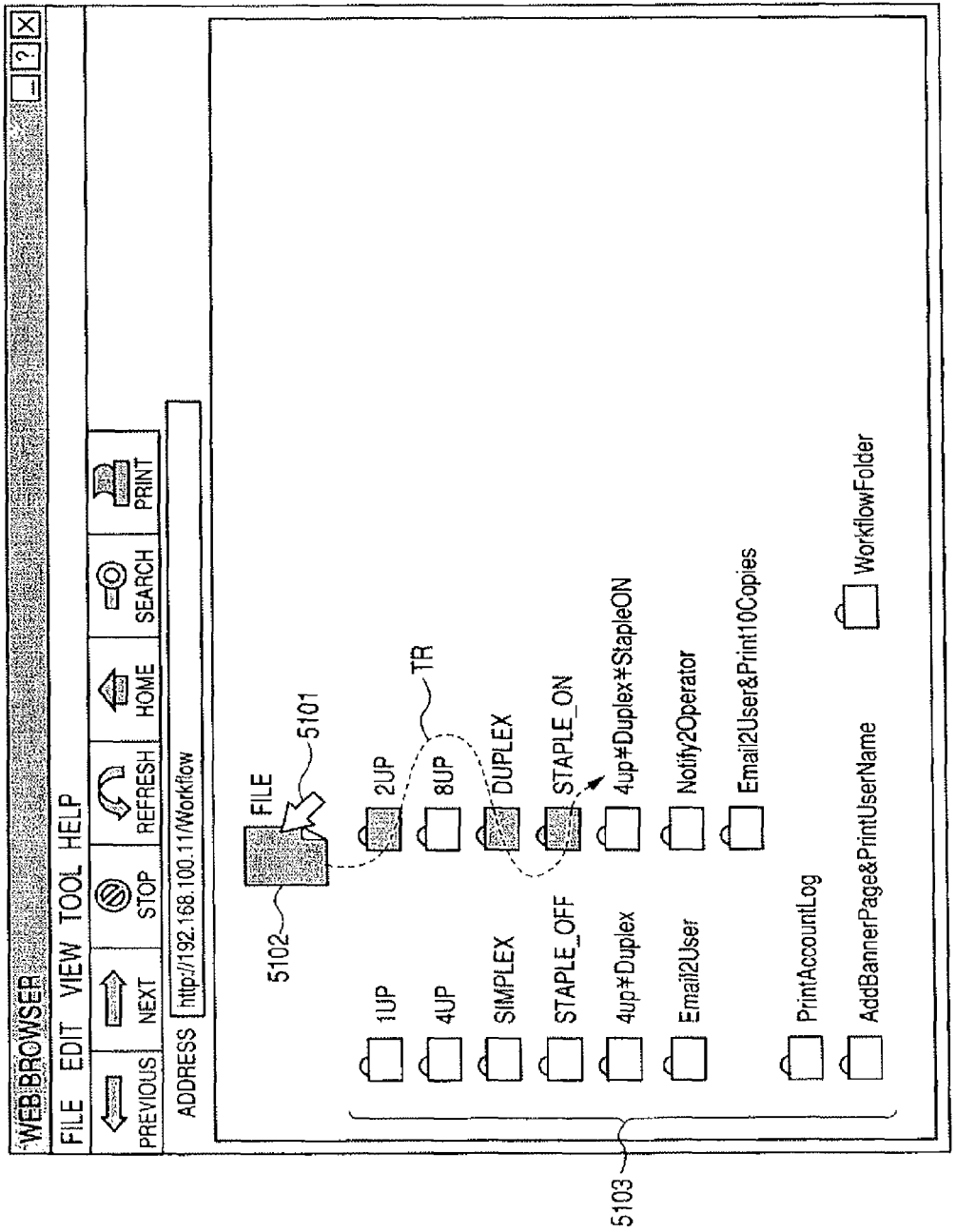
FIG. 29 is a diagram schematically showing an example of transition of a workflow creating operation screen of a data processing apparatus according to the invention.

First, as shown in FIG. 29, the file 5102 is selected by the pointer (S5701) by operating the pointing device (not shown) connected to the client computer 103. The workflow window 5201 is opened (S5721). The file icon 5102 is written into the workflow window 5201 (S5722).

Subsequently, it is confirmed that the file is being continuously selected by the pointer (S5703). Position information (coordinates) is confirmed in association with the movement of the pointer (S5704). At this time, a table (not shown) in which the names and position information (coordinates) of the boxes where the boxes (folder icons) of the main window are arranged have previously been described is held and prepared in the memory apparatus. With reference to this table, whether or not the pointer has passed on the boxes is discriminated (S5706). If it is determined that the pointer does not pass, the processing routine is returned to step S5703.

If it is determined in step S5706 that the pointer has passed, whether or not the branch information has been input is further discriminated (S5707). If it is determined that the branch information is not input, step S5709 follows. If it is determined that the branch information has been input, a branch flag (branch information flag) is set to the high level (S5708) and step S5709 follows. The names and the functions/processes of the passed boxes are obtained (S5909) by referring to the above table. With respect to the boxes which are exclusive to the passed boxes, a warning of the passage inhibition or passage attention is displayed by adding the icons BAT or the like as necessary as shown in FIG. 33 (S5710) and step S5723 follows.

In the display control of the workflow window 5201, whether or not the branch flag has been set to the high level is discriminated in step S5723 or the like. If it is determined that the branch flag has been set to the high level, the branch window is displayed (S5727) and the processing routine is returned to step S5703.

If it is determined in step S5723 that the branch information flag is not set to the high level, whether or not the file has passed through the same box twice is further discriminated (S5724). If it is determined that the file has passed through the same box twice (the case where the box information is the same as one-previous information), the box icon added just before is deleted (S5726) and the processing routine is returned to step S5703.

If it is determined in step S5724 that the file has passed for the first time, a box icon is simply added (S5725) and the processing routine is returned to step S5703.

If it is determined in step S5703 that the selected file has been released, whether or not the flow creation is finished is discriminated (S5731). If it is determined that the flow creation is not finished, the processing routine is returned to step S5702. As shown in FIG. 29, the file is selected again by the pointer 5101 and the processes in step S5703 and subsequent steps are repeated.

If it is determined in step S5731 that the creation of the flow is finished, whether or not it is necessary to correct the flow is discriminated (S5733). If it is determined that it is unnecessary to correct the flow, the processing routine is finished.

If it is determined in step S5732 that it is necessary to correct the flow, the flow is corrected in step S5733 and the processing routine is returned to step S5732.

When this flow is finished, the selected file can be processed in the MFP in accordance with the created flow or the process of the file can be also started by using something as a trigger.

Second Embodiment

Figure 37:
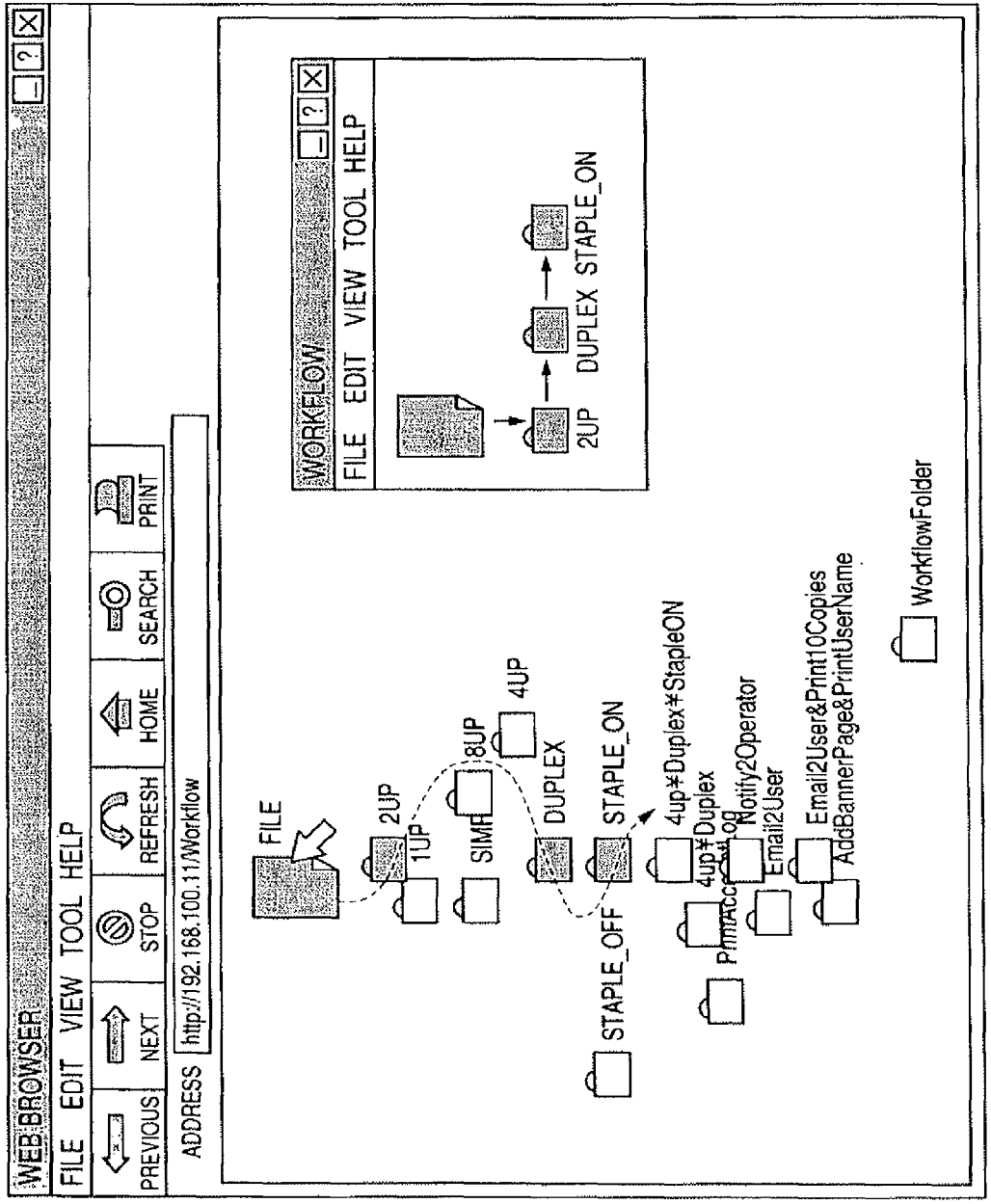
FIG. 37 is a diagram schematically showing an example of transition of the workflow creating operation screen of the data processing apparatus according to the invention.

Although the above first embodiment has been described with respect to the case of executing the folder creating process with respect to the case where the boxes are loosely arranged with margins in the main window, as shown in FIG. 37, if the boxes (in the case where there are a large number of boxes) existing in the main window are jammed or overlaid, there is a risk of occurrence of a situation such as double passing or defective passing of the box. Therefore, it is assumed that in a work space window (or on a desktop) to create the workflow, for example, as shown in FIG. 38, the coordinate information to decide the minimum folder location interval is always set in a restriction table set in the location and the layout display is controlled so as to control the locations of the boxes on the basis of the coordinate information to decide the minimum folder location interval.

Figure 38:
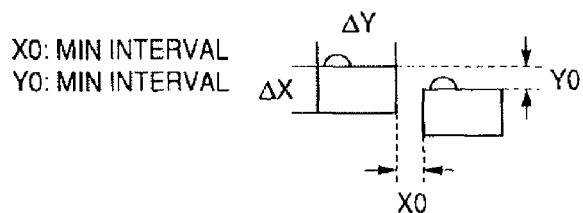
FIG. 38 is a diagram schematically showing an example of a folder location administration table at the time of creation of the workflow which is administrated in the client computer shown in FIG. 1.

FIG. 38 is a diagram schematically showing an example of a folder location administration table at the time of creation of the workflow which is administrated in the client computer 103 shown in FIG. 1. This table is administrated every mode.

In FIG. 38, Mode A corresponds to a mode in which the folders can be aligned and arranged as shown in FIG. 31 and Mode B corresponds to a mode in which a number of folders are arranged at the minimum interval as shown in FIG. 37.

ΔX denotes a length in the X direction of the folder, ΔY a length in the Y direction of the folder, X0 a minimum interval of the folders which can be arranged in the X direction, and Y0 a minimum interval of the folders which can be arranged in the Y direction, respectively. By adjusting the layout intervals of the folders as mentioned above, such a situation that the file erroneously passes through the folders and discriminating performance of the folder names deteriorates at the time of the drag operation by the file can be prevented.

It is assumed that the layout positions of the folder names of the adjacent folders have also been administrated every mode so that the folder names are arranged so as not to be overlaid.

Specifically speaking, since there is a similar risk even if the names of the boxes are too long, it is assumed to make control to restrict the lengths of names. When the folders are defined, the maximum value of the number of characters of the box name is set as a default. If the input name is equal to or less than the number of characters of the maximum value with reference to its numerical value, the input is validated and the display control is made.

Third Embodiment

Figure 39:
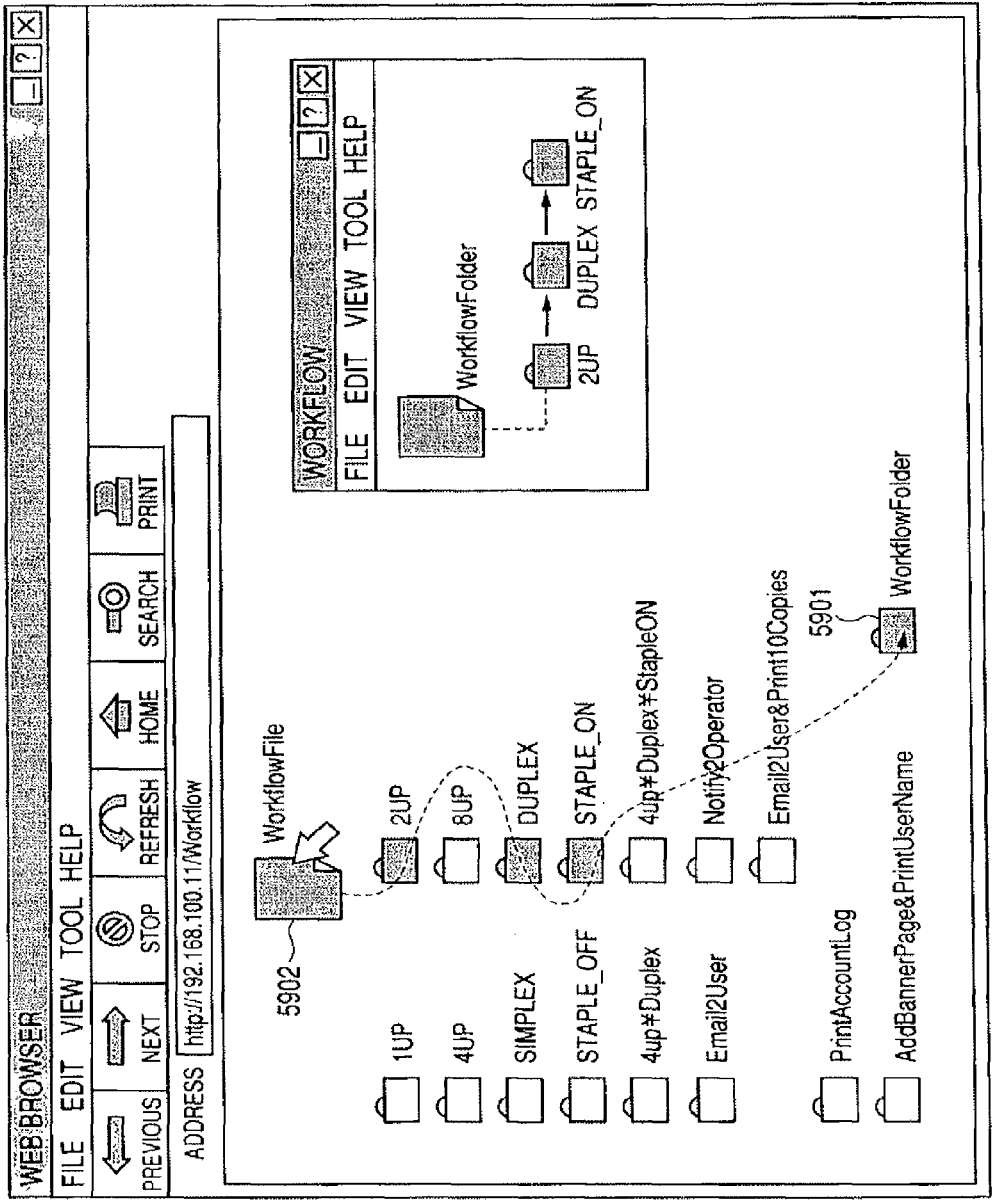
FIG. 39 is a diagram schematically showing an example of transition of the workflow creating operation screen of the data processing apparatus according to the invention.

In the case where the user intends to use the workflow many times, "store flow" has to be set on the workflow window after the flow was created in the first embodiment. To omit such a troublesomeness, as shown in FIG. 39, a workflow folder 5901 is prepared every user, a dummy file such as a workflow file 5902 is selected, and a flow is created by a method similar to that in the first embodiment. At last, the workflow file 5902 is dragged and dropped to the workflow folder 5901.

After that, if there is a file to be processed in this workflow, the same workflow process can be obtained by directly dragging and dropping the workflow folder 5901.

Figure 40:
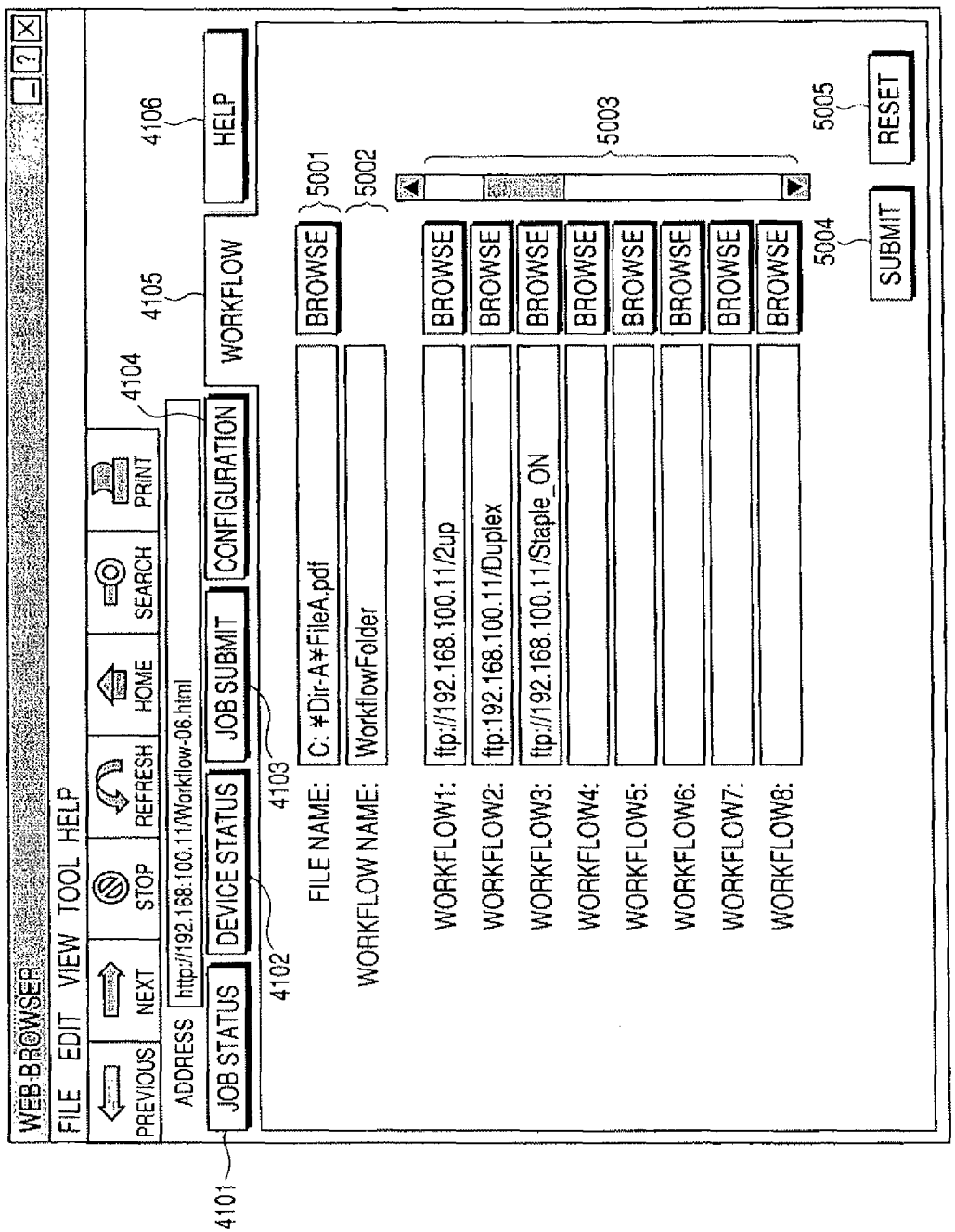
FIG. 40 is a diagram schematically showing an example of transition of the workflow creating operation screen of the data processing apparatus according to the invention.

As shown in FIG. 40, the workflow created here is constructed in such a manner that as one option of the workflow tab 4105, the order and the functions/processing contents of the workflows can be seen and the flow can be also corrected.

Fourth Embodiment

The workflow creating method is not limited to the MFP. Although the example of creating the workflow while seeing the contents in the FTP server in the MFP has been shown in the first embodiment, when considering the work regarding the creating method, it will be understood that even if the similar work is executed on whichever folder (or desktop) in the client computer, the workflow can be created.

Although its operating method has been shown as an example using the mouse and the keyboard of the computer, it will be understood that even if a finger is regarded as a pointer and the operation is performed in the LCD display unit of the touch-panel on the operation unit of the MFP, the similar operation is also executed.

Further, it will be also understood that the operability on the application software is valid without limiting to the operability in the operation of the folders of the client computer. Naturally, the invention can be also applied to means for simply deciding a series of combinations or order without limiting to the method of creating the workflow.

Although the branch process based on the example of the folder creating process by the Web Browser which is displayed on the display unit of the client computer 103 has been described in the first embodiment as shown in FIG. 35, the folder creating process can be also easily applied to the case where the continuous operating procedure necessary in the ordinary application is continuously executed in accordance with the selection track of the folders in which the functions have been set by the pointer. That is, the technique of the invention can be applied to a system, an electronic apparatus, and the like in which the operating instructions are not sequentially executed by various icons or the like but the icons traced as a track by the pointer are sequentially determined as selection execution order and the decided various function processes are continuously executed.

Figure 41:
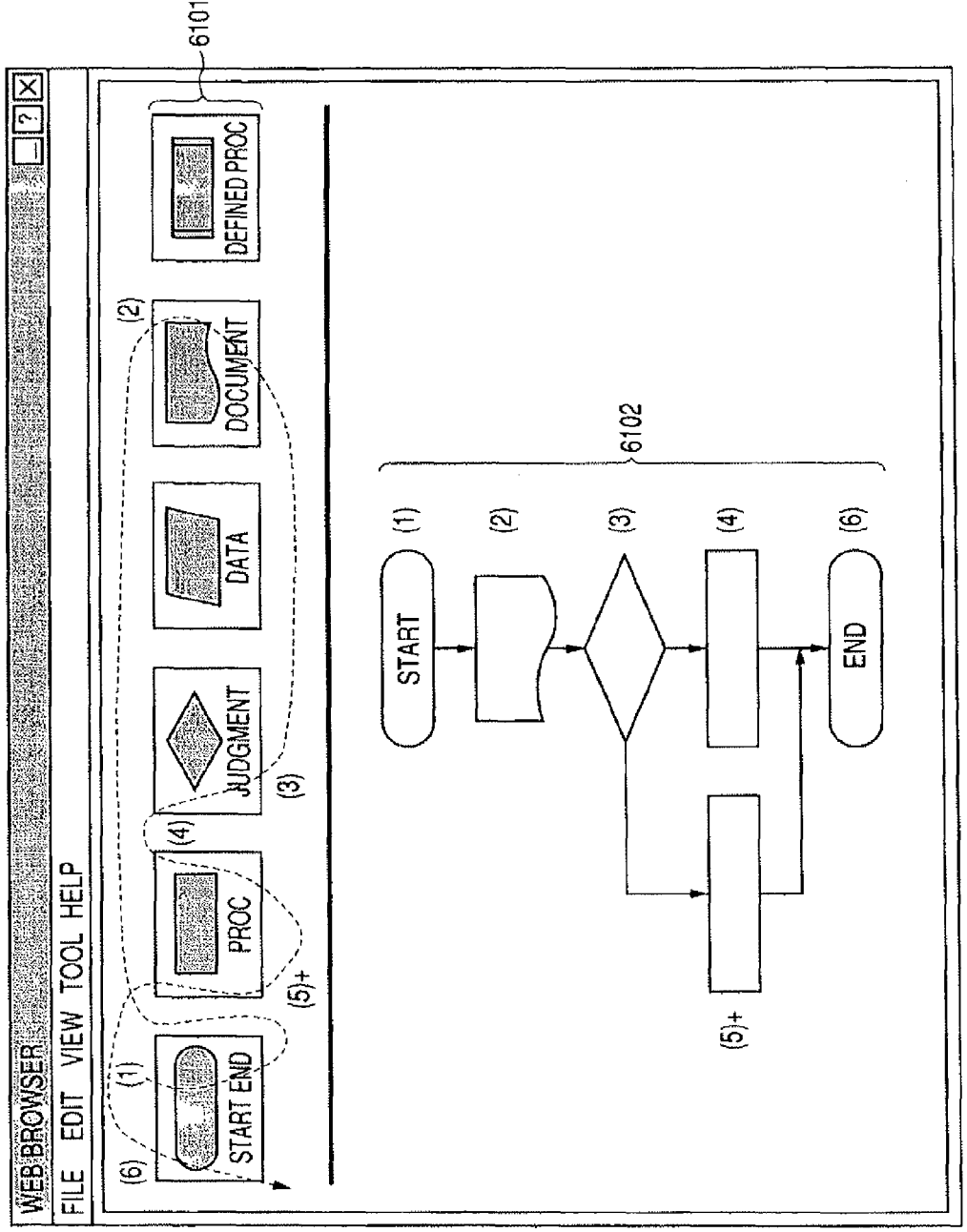
FIG. 41 is a diagram showing an example of execution of an application in the data processing apparatus showing the fourth embodiment of the invention.

For example, FIG. 41 shows the case where the invention is applied to a flowchart creating process according to a flowchart creation processing application.

FIG. 41 is a diagram showing an example of execution of the application in the data processing apparatus showing the fourth embodiment of the invention and corresponds to the case where the application is a flowchart creating application.

In FIG. 41, in the case where the pointer of the pointing device (not shown) has continuously passed through function process objects (templates) 6101, if it is determined that the passed objects are objects (1) to (6), the client computer 103 compares layout information of the objects registered in a reference table linked to the application with passing coordinates of the pointer and processes them in accordance with the monitoring step shown in FIG. 36. Thus, a flowchart with which the objects are coupled can be layout-displayed in consideration of a space (which is determined by the selected paper size) of a figure drawing processing area, that is, a flowchart working space 6102.

For example, in the case of presuming the application describing the flowchart as shown in FIG. 41, if the objects in the templates 6101 are traced by the pointer (not shown) in order from (1) to (2), the flow is drawn and displayed in the flowchart working space 6102 in a manner similar to that in the first embodiment.

However, with respect to the object (5), the condition branch portion is shown as (5)+ and it shows that a shift key or the like has been pressed. Unlike the case of creating the workflow, naturally, it is necessary to form such a new rule that the folder is not deleted even if the file passed through the same template twice, or the like.

Fifth Embodiment

Although the arranged folders can be selected by the user in arbitrary order in the above embodiments, it is also possible to construct the system in such a manner that when the file passed on the folders in order different from the execution order registered in a table which administrates the function execution order in accordance with the function selection or the like, a warning mark is displayed on the screen.

According to the above embodiments, the workflow can be created at better operating efficiency, the job of the same workflow can be easily processed, and the working efficiency can be improved by forming a new workflow box and storing or reusing the formed box.

A construction of data processing programs which can be read out by the image processing system according to the invention will be described hereinbelow with reference to a memory map shown in FIG. 42.

Figure 42:
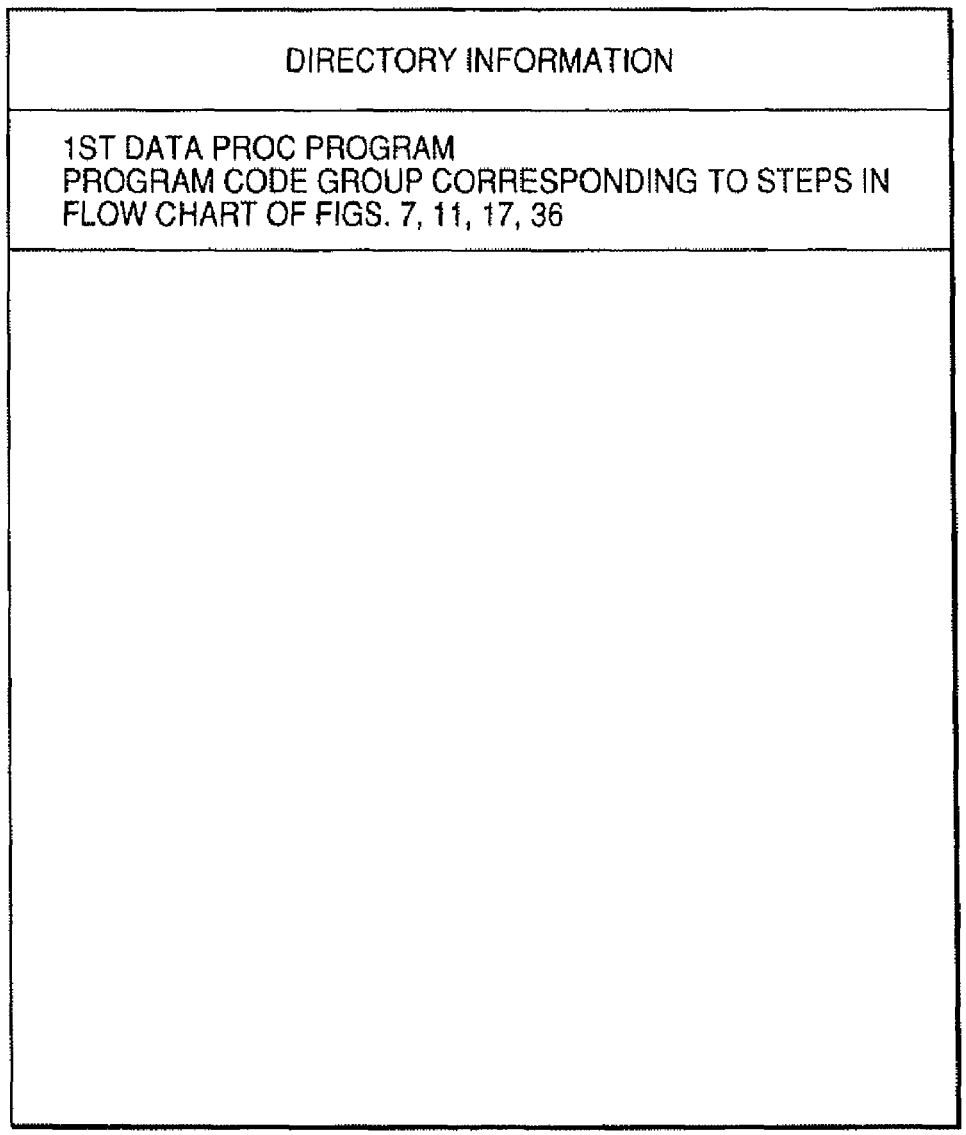
FIG. 42 is a diagram for explaining a memory map of a storage medium for storing various data processing programs which can be read out by the image processing apparatus according to the invention.

FIG. 42 is a diagram for explaining the memory map of a storage medium for storing various data processing programs which can be read out by the image processing apparatus according to the invention.

Although not particularly shown, there is also a case where information for administrating the program group which is stored in the storage medium, for example, version information, implementors, and the like are also stored and information depending on the OS or the like of the program reading side, for example, icons to identify and display the programs or the like are also stored.

Further, data depending on the various programs is also administrated in the directory. There is also a case where a program to install the various programs into the computer or, if the installing program has been compressed, a program for decompressing it or the like is also stored.

The functions shown in FIGS. 7, 11, 17A and 17B, and 36A and 36B in the embodiments are executed by a host computer by a program that is installed from the outside. In such a case, the invention is also applied to the case where an information group including the programs is supplied to an output apparatus by a storage medium such as CD-ROM, flash memory, FD, or the like or from an external storage medium through the network.

Naturally, the objects of the invention are also accomplished by a method whereby the storage medium in which program codes of software to realize the functions of the above embodiments have been recorded as mentioned above is supplied to a system or an apparatus and a computer (or a CPU or an MPU) of the system or the apparatus reads out and executes the program codes stored in the storage medium.

In such a case, the program codes themselves read out from the storage medium realize the new functions of the invention and the storage medium in which the program codes have been stored constructs the invention.

Therefore, the invention is not limited to a form of the program but can be applied to any form such as object codes, program which is executed by an interpreter, script data which is supplied to the OS, or the like so long as they have the functions of the programs.

As a storage medium for supplying the programs, for example, it is possible to use a flexible disk, a hard disk, an optical disk, a magnetooptic disk, an MO, a CD-ROM, a CD-R, a CD-RW, a magnetic tape, a non-volatile memory card, a ROM, a DVD, or the like.

In this case, the program codes themselves read out from the storage medium realize the functions of the embodiments mentioned above and the storage medium in which the program codes have been stored constructs the invention.

As a program supplying method, the program can be also supplied by another method whereby the system is connected to homepage on the Internet by using the browser of the client computer and the computer program of the invention or the compressed file including the automatic installing function is downloaded into a recording medium such as a hard disk or the like from the homepage. The program supplying method can be also realized by a method whereby the program codes constructing the program of the invention are divided into a plurality of files and each file is downloaded from a different homepage. That is, a WWW server, an ftp server, or the like for allowing the program file for realizing the function processes of the invention by the computer to be downloaded to a plurality of users is also contained in Claims of the invention.

The program supplying method can be also realized by a method whereby the program of the invention is encrypted, stored into the storage medium such as a CD-ROM or the like, and distributed to the users, the users who can clear predetermined conditions are allowed to download key information for decrypting the encryption from the homepage through the Internet, and the encrypted program is executed by using the key information and installed into the computer, thereby realizing the functions of the embodiments mentioned above.

Naturally, the invention incorporates not only the case where the computer executes the read-out program codes, so that the functions of the embodiments mentioned above are realized but also the case where the OS (Operating System) or the like which operates on the computer executes a part or all of actual processes on the basis of instructions of the program codes and the functions of the embodiments mentioned above are realized by those processes.

Further, naturally, the invention also incorporates the case where the program codes read out from the storage medium are written into a memory provided for a function expanding board inserted in the computer or a function expanding unit connected to the computer, thereafter, a CPU or the like provided for the function expanding board or the function expanding unit executes a part or all of actual processes on the basis of instructions of the program codes, and the functions of the embodiments mentioned above are realized by those processes.

As many apparently widely different embodiments of the present invention can be made without departing from the spirit and scope thereof, it is to be understood that the invention is not limited to the specific embodiments thereof except as defined in the appended claims.

This application claims priority from Japanese Patent Application No. 2003-383652 filed on Nov. 13, 2003, which is hereby incorporated by reference herein.

What is claimed is:

1. An information processing apparatus which generates workflow data, wherein one or more kinds of processes are applied to a file, comprising: at least one processor to function as:
    a display unit constructed to display a plurality of process icons respectively corresponding to each of a plurality of kinds of processes, and constructed to display a file icon corresponding to the file;
    a moving instruction input unit constructed to input a moving instruction to the file icon;
    a detecting unit constructed to detect passage of the file icon through at least two of the plurality of process icons as the file icon is moved in response to the moving instruction input by the moving instruction input unit; and
    a generating unit constructed to generate workflow data having a plurality of processes corresponding to the plurality of process icons through which the detecting unit detects passage of the file icon,
    wherein, in a case where the detecting unit detects the passage of the file icon through a first process icon of the plurality of process icons, the display unit displays, among the plurality of process icons other than the first process icon, a second process icon corresponding to a process which should not be selected together with the process corresponding to the first process icon, in such a manner that a user can understand that the displayed second process icon should not be selected, and
    wherein, in a case where the detecting unit detects the passage of the file icon through the second process icon corresponding to the process which should not be selected together with the process corresponding to the first process icon, the generating unit does not generate workflow data.

2. An information processing apparatus according to claim 1, wherein, in a case that the moving instruction input unit cancels the moving instruction to the file icon, the generating unit generates workflow data having the plurality of processes corresponding to the plurality of process icons through which the detecting unit detects the passage of the file icon before the cancellation of the moving instruction, in a case where the detecting unit detects that the file icon has been passed through the plurality of process icons in response to the moving instruction input by the moving instruction input unit.

3. An information processing apparatus according to claim 1, wherein, when the detecting unit detects the passage of the file icon through any one of the plurality of process icons, the display unit displays information regarding the process icon through which the file icon passed.

4. An information processing apparatus according to claim 1, wherein, when the detecting unit detects the passage of the file icon through the second process icon after detecting the passage of the file icon through the first process icon, the generating unit does not generate workflow data having the process corresponding to the second process icon.

5. An information processing apparatus according to claim 1, further comprising a branch instruction input unit constructed to make a branch instruction during the passage of the file icon through any one of the plurality of process icons,
    wherein the generating unit generates a first workflow data having one or more processes corresponding to the one or more print process icons which the detecting unit detected the passage of the file icon through before the input of the branch instruction, and also generates second workflow data having one or more processes corresponding to the one or more process icons which the detecting unit detected the passage of the file icon through after the input of the branch instruction.

6. An information processing apparatus according to claim 1, wherein the processes are accumulated as the file icon is moved through the process icons.

7. An information processing apparatus according to claim 1, wherein the process corresponding to a particular process icon is deleted when the file icon passes back through the particular process icon without first passing through other intervening process icons.

8. A control method for an information processing apparatus which generates workflow data, wherein one or more kinds of processes are applied to a file, the method comprising:
    displaying a plurality of process icons respectively corresponding to each of plural kinds of processes and displaying a file icon corresponding to the file;
    inputting a moving instruction to the file icon;
    detecting passage of the file icon through at least two of the plurality of process icons as the file icon is moved in response to the moving instruction;
    generating workflow data having a plurality of processes corresponding to the plurality of process icons through which passage of the file icon is detected;
    in a case where the passage of the file icon through a first process icon of the plurality of process icons is detected, displaying, among the plurality of process icons other than the first process icon, a second process icon corresponding to a process which should not be selected together with the process corresponding to the first process icon, in such a manner that a user can understand that the displayed second process icon should not be selected, and
    wherein, in a case where passage of the file icon through the second process icon corresponding to the process which should not be selected together with the process corresponding to the first process icon is detected, workflow data is not generated.

* * * * *